(12) United States Patent
Gupta

(10) Patent No.: US 11,356,937 B2
(45) Date of Patent: Jun. 7, 2022

(54) TECHNIQUES FOR COORDINATED APPLICATION OF WIRELESS NETWORK SELECTION AND TRAFFIC ROUTING RULES

(71) Applicant: Apple Inc., Cupertino, CA (US)

(72) Inventor: Vivek Gupta, San Jose, CA (US)

(73) Assignee: Apple Inc., Cupertino, CA (US)

(*) Notice: Subject to any disclaimer, the term of this patent is extended or adjusted under 35 U.S.C. 154(b) by 7 days.

(21) Appl. No.: 15/129,372

(22) PCT Filed: Mar. 24, 2015

(86) PCT No.: PCT/US2015/022250
§ 371 (c)(1),
(2) Date: Sep. 26, 2016

(87) PCT Pub. No.: WO2015/148507
PCT Pub. Date: Oct. 1, 2015

(65) Prior Publication Data
US 2017/0181070 A1   Jun. 22, 2017

Related U.S. Application Data

(60) Provisional application No. 61/969,785, filed on Mar. 24, 2014.

(51) Int. Cl.
*H04W 48/18* (2009.01)
*H04W 28/08* (2009.01)
*H04W 48/14* (2009.01)

(52) U.S. Cl.
CPC ........... *H04W 48/18* (2013.01); *H04W 28/08* (2013.01); *H04W 48/14* (2013.01)

(58) Field of Classification Search
None
See application file for complete search history.

(56) References Cited

U.S. PATENT DOCUMENTS

| 2005/0083899 | A1 | 4/2005 | Babbar et al. |
| 2012/0196644 | A1 | 8/2012 | Scherzer et al. |

(Continued)

FOREIGN PATENT DOCUMENTS

| WO | 2013127430 A1 | 9/2013 |
| WO | 2014005654    | 1/2014 |
| WO | 2014021989 A1 | 2/2014 |

OTHER PUBLICATIONS

Office Action received for Korean Patent Application No. 10-2016-7022956, dated Jun. 14, 2017, 9 pages.

(Continued)

*Primary Examiner* — Yaotang Wang
(74) *Attorney, Agent, or Firm* — Eschweiler & Potashnik, LLC

(57) ABSTRACT

Techniques for coordinated application of wireless network selection and traffic routing rules are described. In one embodiment, for example, user equipment (UE) may comprise at least on radio frequency (RF) transceiver, at least one RF antenna, and logic at least a portion of which is in hardware, the logic to process a received radio resource control (RRC) message comprising radio access network (RAN) assistance information, evaluate a threshold condition of an access network discovery and selection function (ANDSF) management object (MO) routing policy based on an access threshold comprised in the RAN assistance information and a corresponding measurement, and apply the ANDSF MO routing policy to route internet protocol (IP) traffic based on the evaluation of the threshold condition. Other embodiments are described and claimed.

6 Claims, 13 Drawing Sheets

(56) References Cited

U.S. PATENT DOCUMENTS

| | | | | |
|---|---|---|---|---|
| 2012/0309447 | A1* | 12/2012 | Mustajarvi | H04W 48/18 |
| | | | | 455/524 |
| 2012/0324100 | A1* | 12/2012 | Tomici | H04L 45/123 |
| | | | | 709/224 |
| 2013/0188500 | A1 | 7/2013 | He et al. | |
| 2013/0272287 | A1 | 10/2013 | Xiang et al. | |
| 2014/0036656 | A1 | 2/2014 | Chou et al. | |
| 2016/0198399 | A1* | 7/2016 | Kim | H04W 48/18 |
| | | | | 455/435.2 |
| 2016/0269985 | A1* | 9/2016 | Bergstrom | H04W 76/10 |
| 2016/0353348 | A1* | 12/2016 | Lee | H04W 36/22 |
| 2017/0019835 | A1* | 1/2017 | Lee | H04W 40/248 |
| 2017/0078936 | A1* | 3/2017 | Bergstrom | H04W 48/18 |

OTHER PUBLICATIONS

"ANDSF traffic steering and Interaction of ANDSF and RAN rules", Alcatel-Lucent et al., 3GPP TSG RAN WG3, Meeting #85, R2-140713, Feb. 2014, 5 pages, author unknown.
"RAN Assistance Information Transmission Mechanism", 3GPP TSG RAN WG2, Meeting #85bis, R2-141319, Mar. 31-Apr. 4, 2014, 2 pages, author unknown.
Office Action received for Canadian Patent Application No. 2938302, dated Jun. 5, 2017, 4 pages.
Extended European Search Report received for European Patent Application No. 15770216.8, dated Sep. 29, 2017, 17 pages.
"Assumptions and Requirements for ANDSF Rules with RAN Thresholds", Motorola Mobility, 3GPP Draft, SA WG2 Meeting 102, S2-141077, Mar. 24-28, 2014, 5 pages (author unknown).
"ANDSF rules with RAN thresholds", Motorola Mobility, 3GPP Change Request SA WG2 Meeting 102, S2-141079, Mar. 24-28, 2014, 5 pages (author unknown).
"3rd Generation Partnership Project; Technical Specification Group Services and System Aspects; Architecture enhancements for non-3GPP accesses (Release 12)", 3GPP Draft, Part 1, XP050835337, 2014, (142 pages) (author unknown).
"3rd Generation Partnership Project; Technical Specification Group Services and System Aspects; Architecture enhancements for non-3GPP accesses (Release 12)", 3GPP Draft, Part 2, XP050835337, 2014, (146 pages) (author unknown).
"Impacts of RAN Rules and Assistance information on ANDSF", Intel Corporation, 3GPP, SA WG2 Meeting #102, S2-141135, Mar. 24-28, 2014, 4 pages (author unknown).
"Proposed way forward on WLAN/3GPP radio interworking", Intel Corporation, 3GPP TSG-RAN2 Meeting #85, R2-140842, Feb. 10-14, 2014, 17 pages (author unknown).
"Inclusion of RAN assistance parameters into ANDSF", AT&T et al., 3GPP SA WG2 Meeting #102, S2-141199, Mar. 24-28, 2014, 3 pages (author unknown), 17 pages (author unknown).
International Search Report and Written Opinion received for PCT Patent Application No. PCT/US2015/022250, dated Jun. 30, 2015, 13 pages.

Notice of Decision to Grant received for Russian Patent Application No. 2016134573, dated Oct. 24, 2017, 11 pages (untranslated).
Examination Report dated Jul. 31, 2019 in connection with Indian Patent Application No. 201647027493.
IEEE Standard for Information technology; "Part 11: Wireless LAN Medium Access Control (MAC) and Physical Layer (PHY) Specifications"; Revision of IEEE Std 802.11-2007; Mar. 29, 2012.
3rd Generation Partnership Project; Technical Specification Group Radio Access Network; Radio Resource Control (RRC); Protocol specification (Release 12); 3GPP TS 25.331 V12.1.0; Mar. 2014.
Universal Mobile Telecommunications System (UMTS); Radio Resource Control (RRC); Protocol specification; (3GPP TS 25.331 version 10.15.0 Release 10); ETSI TS 125 331 V10.15.0; Mar. 2014.
Universal Mobile Telecommunications System (UMTS); Radio Resource Control (RRC); Protocol specification; (3GPP TS 25.331 11.9.0 Release 11; ETSI TS 125 331; v11.9.0; Mar. 2014.
LTE; Evolved Universal Terrestrial Radio Access (E-UTRA); Radio Resource Control (RRC); Protocol specification (3GPP TS 36.331 version 11.7.0 Release 11); ETSI TS 136 331 V11.7.0; Mar. 2014.
3rd Generation Partnership Project; Technical Specification Group Radio Access Network; Evolved Universal Terrestrial Radio Access (E-UTRA); Radio Resource Control (RRC); Protocol specification (Release 12); 3GPP TS 36.331 V12.1.0 (Mar. 2014).
3rd Generation Partnership Project; Technical Specification Group Services and System Aspects; "Architecture enhancements to facilitate communications with packet data networks and applications"; (Release 12); 3GPP TS 23.682 V12 1.0; Mar. 2014.
3rd Generation Partnership Project; Technical Specification Group Services and System Aspects; "Service requirements for Machine-Type Communications (MTC)"; Stage 1; (Release 12); 3GPP TS 22.368 V12.3.0; Dec. 2013.
3rd Generation Partnership Project; Technical Specification Group Services and System Aspects; "Architecture enhancements for non-3GPP accesses"; (Release 12); 3GPP TS 23.402 V12.4.0; Mar. 2014.
3rd Generation Partnership Project; Technical Specification Group Services and System Aspects; "Study on Machine-Type Communications (MTC) and other mobile data applications communications enhancements"; (Release 12) 3GPP TR 23.887 V12.0.0; Dec. 2103.
3rd Generation Partnership Project; Technical Specification Group Core Network and Terminals; "Access to the 3GPP Evolved Packet Core (EPC) via non-3GPP access networks"; Stage 3 (Release 12); 3GPP TS 24.302 V12.4.0; Mar. 2014.
3rd Generation Partnership Project; Technical Specification Group Core Network and Terminals; "Access Network Discovery and Selection Function (ANDSF) Management Object (MO)"; (Release 12); 3GPP TS 24.312 V12.4.0 Mar. 2014.
Hotspot 2.0 Specification; Version 2.0; WiFi Alliance; Feb. 13, 2019.
Hotspot 2.0 (Release 2) Online Sign-Up Certificate Policy Specification; Version 1.2; WiFi Alliance; Jul. 26, 2017.

* cited by examiner

Broadband Wireless Access System 1300

TECHNIQUES FOR COORDINATED APPLICATION OF WIRELESS NETWORK SELECTION AND TRAFFIC ROUTING RULES

RELATED CASE

This application claims priority to U.S. Provisional Patent Application No. 61/969,785, filed Mar. 24, 2014, the entirety of which is hereby incorporated by reference.

TECHNICAL FIELD

Embodiments herein generally relate to communications between devices in broadband wireless communications networks.

BACKGROUND

During general operation, user equipment (UE) in a 3rd Generation Partnership Project (3GPP) radio access network such as an evolved Universal Mobile Telecommunications System Terrestrial Radio Access Network (E-UTRAN) may be capable of maintaining concurrent Wi-Fi and 3GPP RAN data connectivity. In conjunction with establishing Wi-Fi data connectivity, the UE may discover multiple WLANs, and may need to select from among those discovered WLANs in order to determine a WLAN via which to obtain the Wi-Fi data connectivity. Once concurrent Wi-Fi and 3GPP RAN data connectivity has been established, the UE may need to determine which traffic types and/or flows to route through the 3GPP RAN and which traffic types and/or flows to route through the WLAN. Multiple sources, such as an evolved node B (eNB), an access network discovery and selection function (ANDSF) server, and a user of the UE may provide the UE with rules, parameters, preferences, and/or other information that it may use in order perform WLAN selection and/or traffic routing.

DETAILED DESCRIPTION

Figure 1:
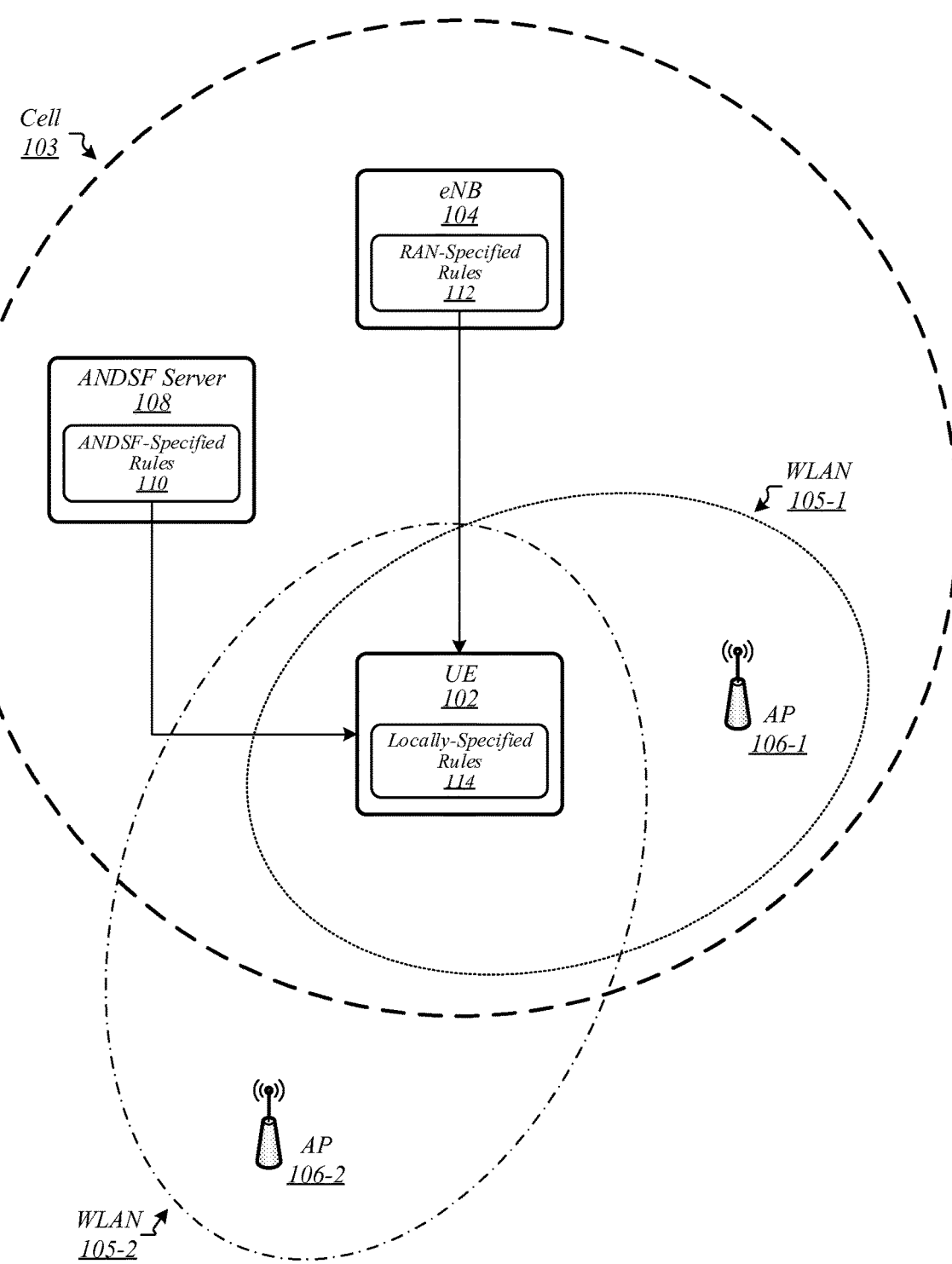
FIG. 1 illustrates an embodiment of a first operating environment.

Various embodiments may be generally directed to techniques for coordinated application of wireless network selection and traffic routing rules. In one embodiment, for example, user equipment (UE) may comprise at least on radio frequency (RF) transceiver, at least one RF antenna, and logic at least a portion of which is in hardware, the logic to process a received radio resource control (RRC) message comprising radio access network (RAN) assistance information, evaluate a threshold condition of an access network discovery and selection function (ANDSF) management object (MO) routing policy based on an access threshold comprised in the RAN assistance information and a corresponding measurement, and apply the ANDSF MO routing policy to route internet protocol (IP) traffic based on the evaluation of the threshold condition. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an example of an operating environment 100 such as may be representative of various embodiments. In operating environment 100, a user equipment (UE) 102 is located within a cell 103 of a 3GPP radio access network (RAN), and a serving eNB 104 for the cell 103 generally provides 3GPP RAN connectivity to UEs within cell 103. In some embodiments, the 3GPP RAN may comprise an evolved Universal Mobile Telecommunications System Terrestrial Radio Access Network (E-UTRAN). In various embodiments, UE 102 may be capable of using such 3GPP RAN connectivity to communicate with one or more packet data networks (PDNs), such as the Internet. UE 102 is also located within communication range of multiple wireless local area networks (WLANs) 105-1 and 105-2, wireless connectivity to which is provided by respective access points (APs) 106-1 and 106-2. In some embodiments, UE 102 may be capable of using such WLAN connectivity to communicate with the one or more PDNs, in addition to—or instead of—using its 3GPP RAN connectivity for that purpose.

In various embodiments, in conjunction with managing its wireless data connectivity, UE 102 may need to select from among multiple available WLANs in order to determine a WLAN via which to obtain Wi-Fi data connectivity. In the example of operating environment 100, UE 102 may need to select between WLANs 105-1 and 105-2. In some embodiments, in conjunction with managing its wireless data connectivity, UE 102 may need to determine the respective traffic types and/or flows that are to be routed through each multiple wireless access interfaces through which it has wireless data connectivity. For example, having established 3GPP RAN data connectivity via eNB 104 and Wi-Fi data connectivity via AP 106-1, UE 102 may need to determine which traffic types and/or flows to route through its 3GPP RAN interface and which traffic types and/or flows to route through its WLAN interface. The embodiments are not limited to these examples.

In various embodiments, one or more external devices may provide UE 102 with rules that it may apply in conjunction with WLAN selection and/or traffic routing decisions. For example, in some embodiments, an access network discovery and selection function (ANDSF) server 108 may provide UE 102 with ANDSF-specified rules 110. ANDSF server 108 may generally comprise a 3GPP network element that is configured to assist UEs such as UE 102 with discovering, selecting, and/or using wireless access networks in conjunction with wireless data communications. ANDSF-specified rules 110 may generally comprise rules defined within an ANDSF management object (MO) for UE 102, and may include rules applicable to selection among multiple WLANs (hereinafter, "WLAN selection rules") and/or rules applicable to routing traffic across multiple wireless access interfaces (hereinafter, "traffic routing rules").

In various embodiments, eNB 104 may provide UE 102 with RAN-specified rules 112. RAN-specified rules 112 may generally comprise rules defined by threshold values for measurements relating to 3GPP RAN parameters—such as reference signal received powers (RSRPs) and/or reference signal received qualities (RSRQs)—and/or defined by threshold values for measurements relating to WLAN parameters—such as basic service set (BSS) loads and/or backhaul rates. Like ANDSF-specified rules 110, RAN-specified rules 112 may include WLAN selection rules and/or traffic routing rules. In some embodiments, UE 102 may be configured with one or more locally-specified rules 114. Locally-specified rules 114 may generally comprise rules defined by user preferences or other settings that are configured locally at UE 102. Like ANDSF-specified rules 110 and RAN-specified rules 112, locally-specified rules 114 may include WLAN selection rules and/or traffic routing rules. The embodiments are not limited in this context.

Figure 2:
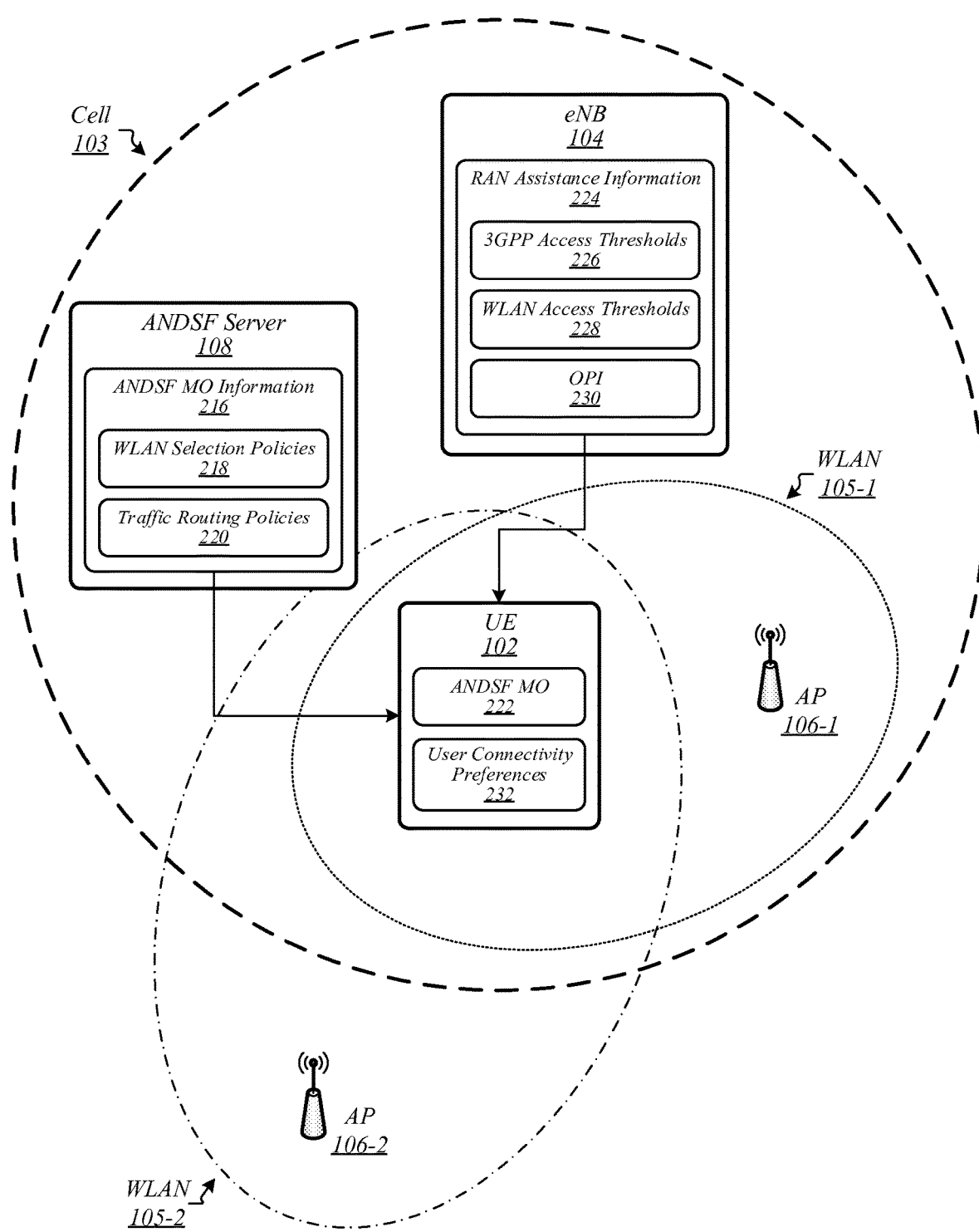
FIG. 2 illustrates an embodiment of a second operating environment.

FIG. 2 illustrates an example of an operating environment 200 such as may be representative of various embodiments. More particularly, operating environment 200 depicts examples of information that ANDSF server 108 and eNB 104 of FIG. 1 may send to UE 102 in some embodiments in order to provide UE 102 with ANDSF-specified rules 110 and RAN-specified rules 112, respectively. As reflected in operating environment 200, in various embodiments, ANDSF server 108 may send the ANDSF-specified rules 110 of FIG. 1 to UE 102 in the form of ANDSF MO information 216. In some embodiments, UE 102 may receive ANDSF MO information 216 via an S14 interface connection. In various embodiments, ANDSF MO information 216 may comprise one or more WLAN selection policies 218. In some embodiments, each WLAN selection policy 218 may comprise a WLAN selection policy to be defined by a WLANSP node of an ANDSF MO. In various embodiments, ANDSF MO information 216 may comprise one or more traffic routing policies 220. In some embodiments, each traffic routing policy 220 may comprise a traffic routing policy to be defined by an inter-system routing policy (ISRP) node or an inter-access point name routing policy (IARP) node of an ANDSF MO. In various embodiments, by sending ANDSF MO information 216 to UE 102, ANDSF server 108 may configure an ANDSF MO 222 of UE 102 with one or more WLANSP nodes corresponding to one or more WLAN selection policies 218, and/or with one or more ISRP and/or IARP nodes corresponding to one or more traffic routing policies 220. The embodiments are not limited in this context.

In some embodiments, eNB 104 may send the RAN-specified rules 112 of FIG. 1 to UE 102 in the form of RAN assistance information 224. In various embodiments, RAN assistance information 224 that UE 102 receives from eNB 104 may be comprised within a received radio resource control (RRC) message. In some embodiments, RAN assistance information 224 may indicate one or more one or more RAN-specified rules 112 in the form of one or more thresholds. In various embodiments, each such threshold may indicate a rule that may be evaluated by comparing the threshold value to a corresponding measured value. In some embodiments, RAN assistance information 224 may comprise one or more 3GPP access thresholds 226. In various embodiments, each 3GPP access threshold 226 may indicate a rule that may be evaluated by comparing the 3GPP access threshold 226 to a corresponding measured value of a parameter relating to wireless data connectivity via a 3GPP wireless access interface. In some embodiments, 3GPP access thresholds 226 may include one or more reference signal received power (RSRP) thresholds and/or one or more reference signal received quality (RSRQ) thresholds. The embodiments are not limited to these examples.

In various embodiments, RAN assistance information 224 may comprise one or more WLAN access thresholds 228. In some embodiments, each WLAN access threshold 228 may indicate a rule that may be evaluated by comparing the WLAN access threshold 228 to a corresponding measured value of a parameter relating to wireless data connectivity via a WLAN wireless access interface. In various embodiments, WLAN access thresholds 228 may include one or more basic service set (BSS) load thresholds. For example, in some embodiments, WLAN access thresholds 228 may include a threshold corresponding to a MaximumBSSLoad parameter according to the Wi-Fi Alliance Technical Committee Hotspot 2.0 Release 2 Technical Specification released October 2014 ("the HotSpot 2.0 specification"). In various embodiments, WLAN access thresholds 228 may include one or more backhaul thresholds. For example, in some embodiments, WLAN access thresholds 228 may include a threshold corresponding to a MinimumBackhaulThreshold parameter according to the HotSpot 2.0 specification. In various embodiments, RAN assistance information 224 may comprise an offload preference indicator (OPI) 230. In some embodiments, OPI 230 may generally indicate operator preferences regarding which UEs in the 3GPP RAN of cell 103 should offload traffic to WLANs. In various embodiments, OPI 230 may indicate a respective internet protocol (IP) traffic offloading preference for cell 103 with respect to each of a plurality of defined OPI classes. The embodiments are not limited in this context.

In some embodiments, the one or more locally-specified rules 114 of FIG. 1 may be defined by one or more user connectivity preferences 232 configured at UE 102. In various embodiments, some or all of user connectivity preferences 232 may be configured based on user input received by UE 102. In some embodiments, each user connectivity preference 232 may comprise a setting or other parameter indicating a corresponding rule relating to WLAN selection and/or traffic routing on the part of UE 102. In one example, UE 102 may be configured with a user connectivity preference 232 indicating that a particular WLAN is always to be used to establish Wi-Fi data connectivity if that particular WLAN is within communication range. In another example, UE 102 may be configured with a user connectivity preference 232 indicating that IP traffic flows associated with a particular application are always to be communicated via a 3GPP RAN interface. The embodiments are not limited to these examples.

During general operation, UE 102 may periodically need to make decisions regarding WLAN selection and/or traffic routing. Any of the various policies, thresholds, and preferences with which UE 102 may be provided may potentially be useful in conjunction with any particular such decision. However, if UE 102 is not configured to apply such policies, thresholds, and preferences—and the rules that they define—in a coordinated fashion, it may be unable to use them to make appropriate WLAN selection and/or traffic routing decisions. For example, if ANDSF-specified rules 110, RAN-specified rules 112, and locally-specified rules 114 of FIG. 1 do not agree regarding which of WLANs 105-1 and 105-2 UE 102 should select, and UE 102 is not configured in such a way that it can prioritize among or reconcile these various types of rules, then UE 102 may be unable to perform WLAN selection.

Disclosed herein are techniques for coordinated application of wireless network selection and traffic routing rules. According to various such techniques, a UE may be configured to observe a priority order with respect to ANDSF-specified, RAN-specified, and locally-specified rules for WLAN selection and traffic routing. In some embodiments, a UE may be operative to configure a rule of one such type using a threshold or parameter defining a rule of another such type. For example, in various embodiments, a UE may be operative to configure an ISRP or IARP of an ANDSF MO with one or more thresholds specified by received RAN assistance information. The embodiments are not limited to this example.

Figure 3:
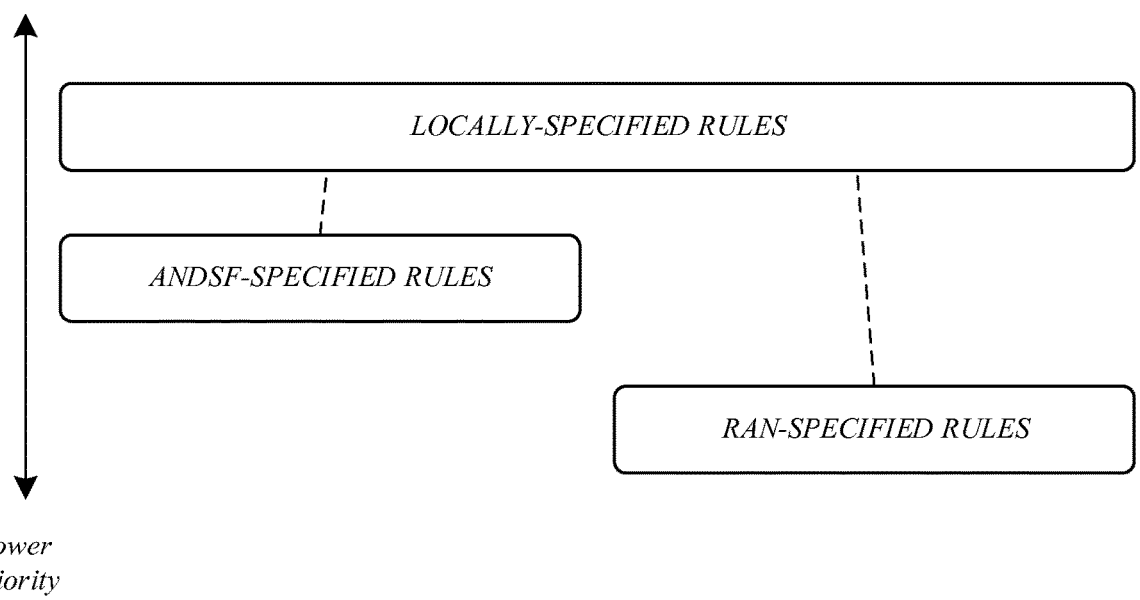
FIG. 3 illustrates an embodiment of a priority scheme.

FIG. 3 illustrates an example of a priority scheme 300 such as may be representative of some embodiments. More particularly, priority scheme 300 may be representative of a priority order that may be defined with respect to ANDSF-specified, RAN-specified, and locally-specified rules for WLAN selection and traffic routing in various embodiments. According to priority scheme 300, the highest priority is given to locally-specified rules. ANDSF-specified rules are afforded the next highest level of priority, while RAN-specified rules are assigned the lowest level of priority. In some embodiments, according to priority scheme 300, the application of ANDSF-specified rules may be defined to be mutually exclusive with the application of RAN-specified rules. In such embodiments, RAN-specified rules may be applied only if no ANDSF-specified rules have been configured, and may be ignored otherwise. In various embodiments, according to priority scheme 300, locally-specified rules may always take precedence over ANDSF-specified rules and RAN-specified rules. In some embodiments, priority scheme 300 may permit the application of ANDSF-specified rules or RAN-specified rules that are not preempted by any locally-specified rules that have been configured. The embodiments are not limited in this context.

Figure 4:
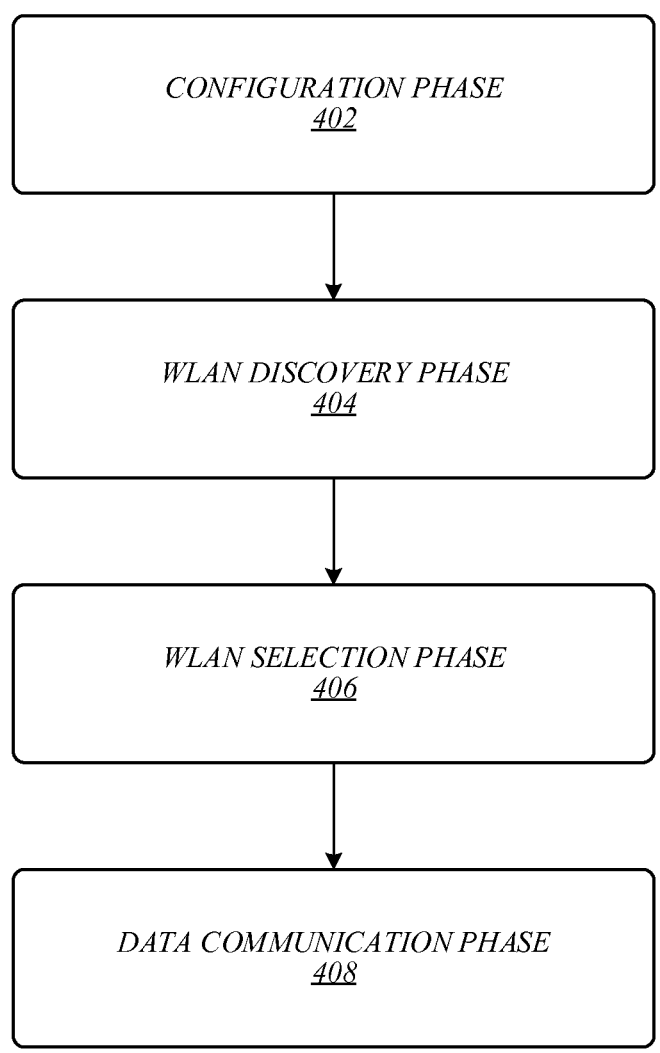
FIG. 4 illustrates an embodiment of a connectivity procedure.

FIG. 4 illustrates an example of a connectivity procedure 400 such as may be representative of a procedure according to which UE 102 of FIGS. 1 and 2 may establish and utilize wireless data connectivity in various embodiments. In some embodiments, connectivity procedure 400 may comprise a configuration phase 402. In various embodiments, during configuration phase 402, UE 102 may be provided with one or more rules relating to wireless network discovery, selection, and/or traffic routing. In some embodiments, UE 102 may be configured with one or more ANDSF-specified rules in the form of policies provisioned within ANDSF MO 222, such as one or more WLAN selection policies 218 and/or one or more traffic routing policies 220. In various embodiments, UE 102 may be provided with one or more RAN-specified rules in the form of one or more 3GPP access thresholds 226, one or more WLAN access thresholds 228, and/or an OPI 230. In some embodiments, UE 102 may be configured with one or more locally-specified rules 114 in the form of user connectivity preferences 232 determined based on user input. The embodiments are not limited in this context.

In various embodiments, connectivity procedure 400 may comprise a WLAN discovery phase 404. In some embodiments, during WLAN discovery phase 404, UE 102 may discover one or more WLANs. For example, UE 102 may discover WLANs 105-1 and 105-2 of FIG. 2. In various embodiments, UE 102 may discover the one or more WLANs based on WLAN discovery information comprised within ANDSF MO information 216 and/or provisioned within ANDSF MO 222. The embodiments are not limited in this context.

In some embodiments, connectivity procedure 400 may comprise a WLAN selection phase 406. In various embodiments, during WLAN selection phase 406, UE 102 may select a WLAN via which to exchange Wi-Fi data communications and establish a connection with that WLAN. For example, UE 102 may select between WLANs 105-1 and 105-2 of FIG. 2 and establish a connection with the selected WLAN. In some embodiments, in selecting a WLAN during WLAN selection phase 406, UE 102 may apply one or more rules with which it was configured during configuration phase 402. The embodiments are not limited in this context.

In various embodiments, connectivity procedure 400 may comprise a data communication phase 408. In some embodiments, during data communication phase 408, UE 102 may exchange data with one or more remote devices using one or more wireless access interfaces. In various embodiments, in conjunction with such data exchange, UE 102 may route traffic across multiple wireless access interfaces. For example, UE 102 may route some traffic flows through eNB 104 via a 3GPP RAN access interface and may route other traffic flows through a WLAN selected during WLAN selection phase 406 via a WLAN access interface. In some embodiments, UE 102 may determine which traffic flows to route across which wireless access interfaces by applying one or more rules with which it was configured during configuration phase 402. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
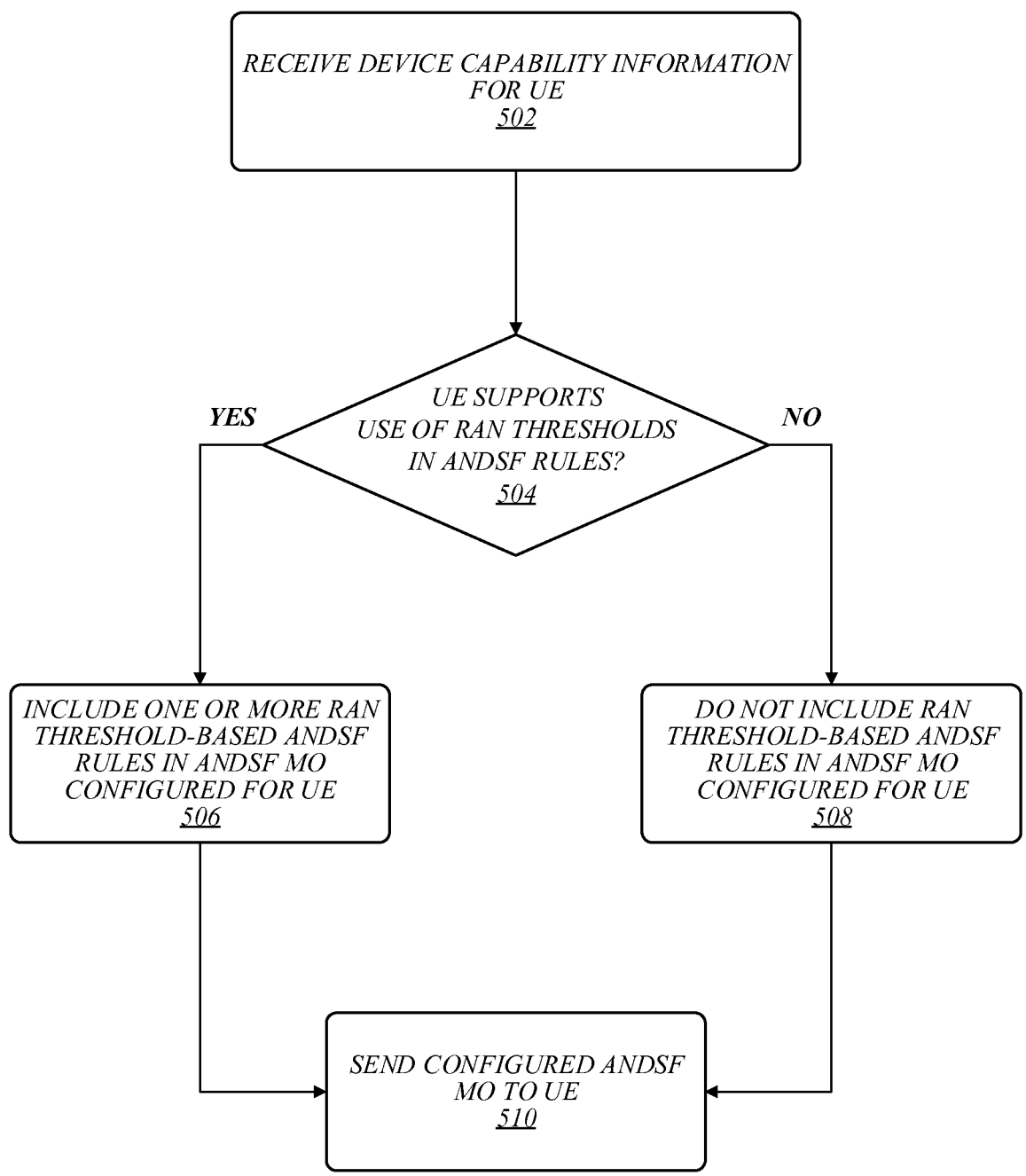
FIG. 5 illustrates an embodiment of a first logic flow.

FIG. 5 illustrates one embodiment of a logic flow 500, which may be representative of operations that may be performed in various embodiments in conjunction with the implementation of the disclosed techniques for coordinated application of wireless network selection and traffic routing rules. For example, logic flow 500 may be representative of operations that may be performed in some embodiments by ANDSF server 108 of FIGS. 1 and 2 during configuration phase 402. As shown in FIG. 5, device capability information for a UE may be received at 502. For example, ANDSF server 108 may receive device capability information from UE 102. In various embodiments, the device capability information may indicate whether the UE is capable of supporting the use of RAN thresholds in ANDSF rules. In some embodiments, the device capability information may comprise an ANDSF MO. In various such embodiments, the ANDSF MO may include a UE_Profile node comprising a DevCapability leaf that indicates whether the UE is capable of supporting the use of RAN thresholds in ANDSF rules. Based on the device capability information received at 502, a determination of whether the UE is capable of supporting the use of RAN thresholds in ANDSF rules may be performed at 504. For example, ANDSF server 108 may determine whether UE 102 supports the use of RAN thresholds in ANDSF rules based on device capability information received from UE 102.

If it is determined at 504 that the UE supports the use of RAN thresholds in ANDSF rules, flow may pass to 506. At 506, an ANDSF MO may be configured for the UE, and one or more RAN threshold-based ANDSF rules may be included in that ANDSF MO. For example, in response to a determination that UE 102 supports the use of RAN thresholds in ANDSF rules, ANDSF server 108 may include one or more RAN threshold-based ANDSF rules in an ANDSF MO that it configures for UE 102. In some embodiments, each RAN threshold-based ANDSF rule may be comprised in an ANDSF policy, such as an ISRP or an IARP. In various embodiments, each RAN threshold-based ANDSF rule may comprise a validity condition within an ANDSF MO policy. In some embodiments, a configuration flag in the configured ANDSF MO may be set to indicate that the ANDSF MO contains one or more RAN threshold-based ANDSF rules. In various embodiments, the configuration flag may be comprised in a UE_Profile node of the configured ANDSF MO.

If it is determined at 504 that the UE does not support the use of RAN thresholds in ANDSF-specified rules, flow may pass to 508. At 508, an ANDSF MO may be configured for the UE, and no RAN threshold-based ANDSF rules may be included in that ANDSF MO. For example, in response to a determination that UE 102 does not support the use of RAN thresholds in ANDSF rules, ANDSF server 108 may not include any RAN threshold-based ANDSF rules in an ANDSF MO that it configures for UE 102. In some embodiments, a configuration flag in the configured ANDSF MO may be set to indicate that the ANDSF MO does not contain any RAN threshold-based ANDSF rules. In various embodiments, the configuration flag may be comprised in a UE_Profile node of the configured ANDSF MO. From either 506 or 508, flow may pass to 510, where the configured ANDSF MO may be sent to the UE. For example, after configuring an ANDSF MO for UE 102, ANDSF server 108 may send the configured ANDSF MO to UE 102. The embodiments are not limited to these examples.

It is worthy of note that the actual RAN threshold values that may be appropriate for use by a UE operating in a given RAN cell may depend on characteristics of the radio environment of that cell. For example, an RSRP value that is relatively high in the context of the radio environment in one cell may be relatively low in the context of the radio environment in another cell. In some embodiments, it may be unlikely that an ANDSF server configuring a RAN threshold-based rule in an ANDSF policy will have awareness of the relevant characteristics of the radio environments in the cells of its network. In various embodiments, if the ANDSF selects a default value for a given RAN threshold associated with a RAN threshold-based rule in an ANDSF policy, that default value may be excessively high with respect to some cells in the network and excessively low with respect to other cells. As such, in some embodiments, the ANDSF server may not select any static or default values for RAN thresholds associated with RAN threshold-based ANDSF rules, and the ANDSF policies containing such rules in the ANDSF MO may not contain static or default values for those RAN thresholds. The embodiments are not limited in this context.

Returning to FIG. 2, in various embodiments, the various thresholds comprised in RAN assistance information 224 may be particularly suitable for use in conjunction with traffic routing decisions. For example, UE 102 may be able to determine whether it is located near an edge of cell 103 based on an RSRP threshold and/or an RSRQ threshold comprised among 3GPP access thresholds 226, and may determine whether to route traffic via a WLAN access interface or a 3GPP RAN access interface based on whether it is located near the cell edge. In another example, UE 102 may determine whether to route traffic via a WLAN access interface or a 3GPP RAN access interface based on OPI 230, which may be reflective of offloading preferences of a 3GPP RAN operator in some embodiments. In various embodiments, the RAN-centric nature of the various thresholds that may be comprised in RAN assistance information 224 may render them less suitable for use in conjunction with WLAN selection. As such, according to the disclosed techniques for coordinated application of wireless network selection and traffic routing rules in some embodiments, ANDSF WLAN selection policies may not be permitted to contain validity conditions that are based on RAN assistance information thresholds.

Figure 6:
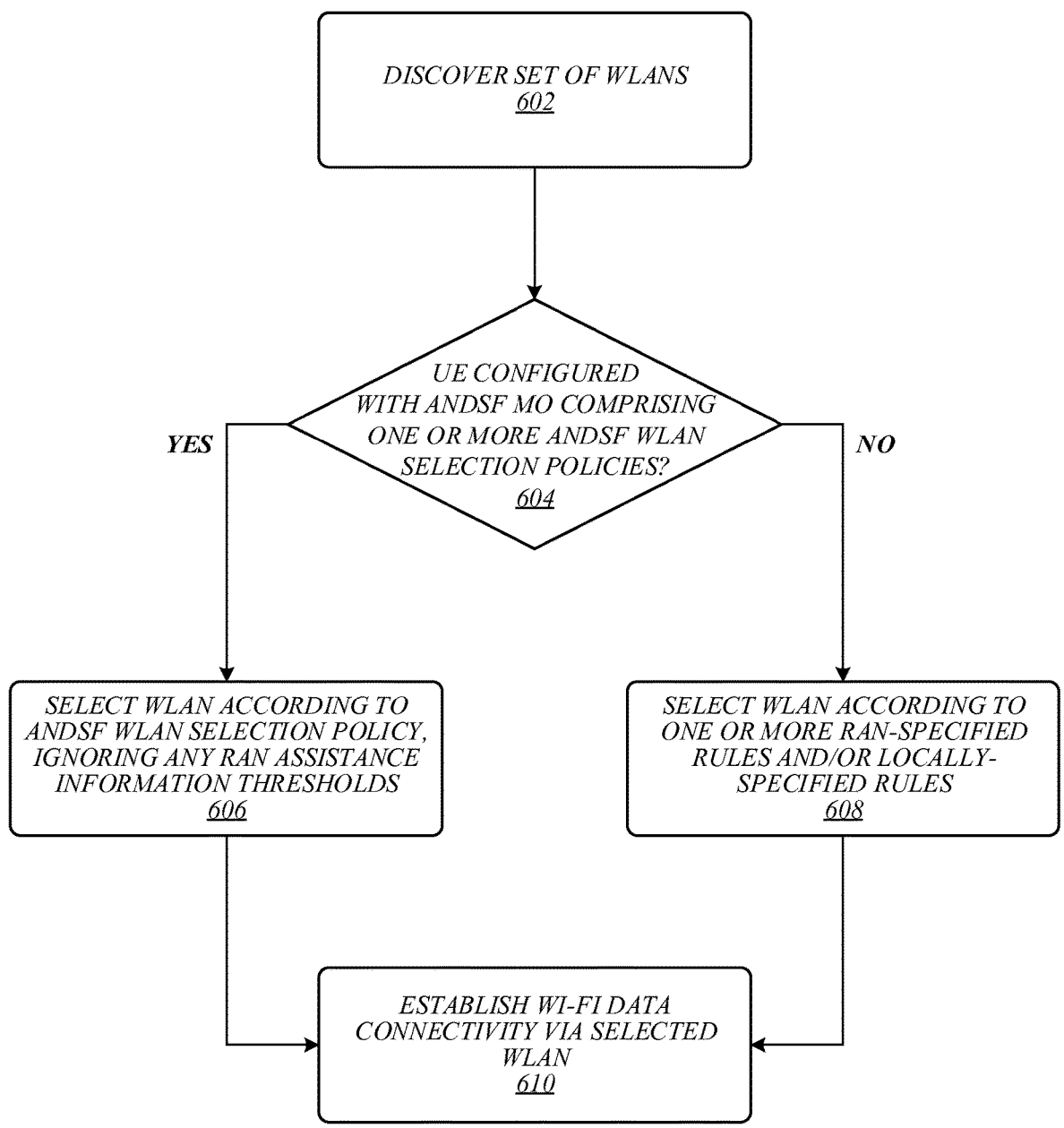
FIG. 6 illustrates an embodiment of a second logic flow.

FIG. 6 illustrates one embodiment of a logic flow 600, which may be representative of operations that may be performed in various embodiments in which ANDSF WLAN selection policies are not permitted to contain validity conditions that are based on RAN assistance information thresholds. For example, logic flow 600 may be representative of operations that may be performed in some such embodiments by UE 102 during WLAN discovery phase 404 and WLAN selection phase 406. As shown in FIG. 6, a set of WLANs may be discovered at 602. For example, UE 102 may discover WLANs 105-1 and 105-2. Flow may then proceed from 604 depending on whether the UE is configured with an ANDSF MO that comprises one or more ANDSF WLAN selection policies.

If the ANDSF MO for the UE comprises one or more ANDSF WLAN selection policies, flow may pass from 604 to 606, where the UE may select a WLAN according to an ANDSF WLAN selection policy, ignoring any RAN assistance information thresholds that it may have received. For example, if ANDSF MO 222 comprises one or more ANDSF WLAN selection policies, UE 102 may select WLAN 105-1 or 105-2 based on such a policy, without reference to any thresholds comprised in RAN assistance information 224 that UE 102 has received from eNB 104. If the ANDSF MO for the UE does not contain an ANDSF WLAN selection policy, flow may pass from 604 to 608, where the UE may select a WLAN according to one or more RAN-specified rules and/or locally-specified rules. For example, if ANDSF MO 222 does not contain an ANDSF WLAN selection policy, UE 102 may select WLAN 105-1 or 105-2 based on one or more thresholds comprised in RAN assistance information 224 and/or based on user connectivity preferences 232. From either 606 or 608, flow may pass to 610, where the UE may establish Wi-Fi data connectivity via the selected WLAN. For example, after selecting WLAN 105-1, UE 102 may exchange communications with AP 106-1 in order to establish Wi-Fi data connectivity via WLAN 105-1. The embodiments are not limited to these examples.

Returning to FIG. 2, in various embodiments, it may be desirable that UE 102 be configured to perform traffic routing decisions without reference to RAN assistance information 224 in some roaming scenarios. For example, if UE 102 is roaming and eNB 104 is an eNB of a visited public land mobile network (V-PLMN) for UE 102, but UE 102 is using a home ANDSF (H-ANDSF) policy for traffic routing, then it may be desirable that UE 102 ignore RAN assistance information 224 for the purpose of applying the H-ANDSF traffic routing policy. In some embodiments, it may be desirable that UE 102 be configured to ignore RAN assistance information 224 in such scenarios due to the potential for relevant parameters to be unavailable at the V-PLMN. For example, a V-PLMN for UE 102 may not be aware of relevant conditions with respect to WLAN APs that have service agreements with an operator of a home PLMN (H-PLMN) for UE 102, and thus UE 102 may not have access to information needed to appropriately apply an H-ANDSF routing policy. The embodiments are not limited to this example.

In various embodiments, it may be desirable that UE 102 be configured to apply one or more RAN thresholds comprised in RAN assistance information 224 in other roaming scenarios. For example, if UE 102 is roaming, eNB 104 is an eNB of a V-PLMN for UE 102, and UE 102 is using a visited ANDSF (V-ANDSF) policy for traffic routing, then it may be desirable that UE 102 apply one or more RAN thresholds comprised in RAN assistance information 224 for the purpose of applying the V-ANDSF traffic routing policy. In some embodiments, it may be desirable that UE 102 be configured to apply RAN thresholds in RAN assistance information 224 in such scenarios because the V-PLMN may be assumed to have awareness of conditions relevant to traffic routing policies configured by the V-ANDSF. Likewise, it may be desirable that UE 102 be configured to apply RAN thresholds in RAN assistance information 224 in conjunction with using H-ANDSF traffic routing policies in non-roaming scenarios, because the H-PLMN may be assumed to have awareness of conditions relevant to traffic routing policies configured by the H-ANDSF. As such, in various embodiments, UE 102 may be configured to apply RAN thresholds in RAN assistance information 224 in conjunction with using an H-ANDSF traffic routing policy while operating in an H-PLMN or using a V-ANDSF traffic routing policy while operating in a V-PLMN, but to ignore any RAN thresholds in RAN assistance information 224 in conjunction with using an H-ANDSF traffic routing policy while operating in a V-PLMN.

In some embodiments, the ANDSF MO 222 for UE 102 may include one or more ANDSF routing policies that include OPI-based validity conditions. For example, in various embodiments, UE 102 may be configured with an ISRP that contains an OPI-based validity condition. In some embodiments, UE 102 may be configured to handle an OPI contained in received RAN assistance information in a fashion analogous to the aforementioned approach to handling RAN thresholds in received RAN assistance information. Namely, in various embodiments, UE 102 may be configured such that when all other offloading criteria are fulfilled, it makes the final offloading decision based on the received OPI bitmap if it is operating in an H-PLMN and applying an H-ANDSF policy or operating in a V-PLMN and applying a V-ANDSF policy, but without regard to the OPI bitmap if it is operating in a V-PLMN but applying an H-ANDSF policy. In some embodiments, inter-operator coordination may be utilized to enable UE 102 to take the OPI bitmap into account in cases where it is operating in a V-PLMN but applying an H-ANDSF policy. The embodiments are not limited in this context.

Figure 7:
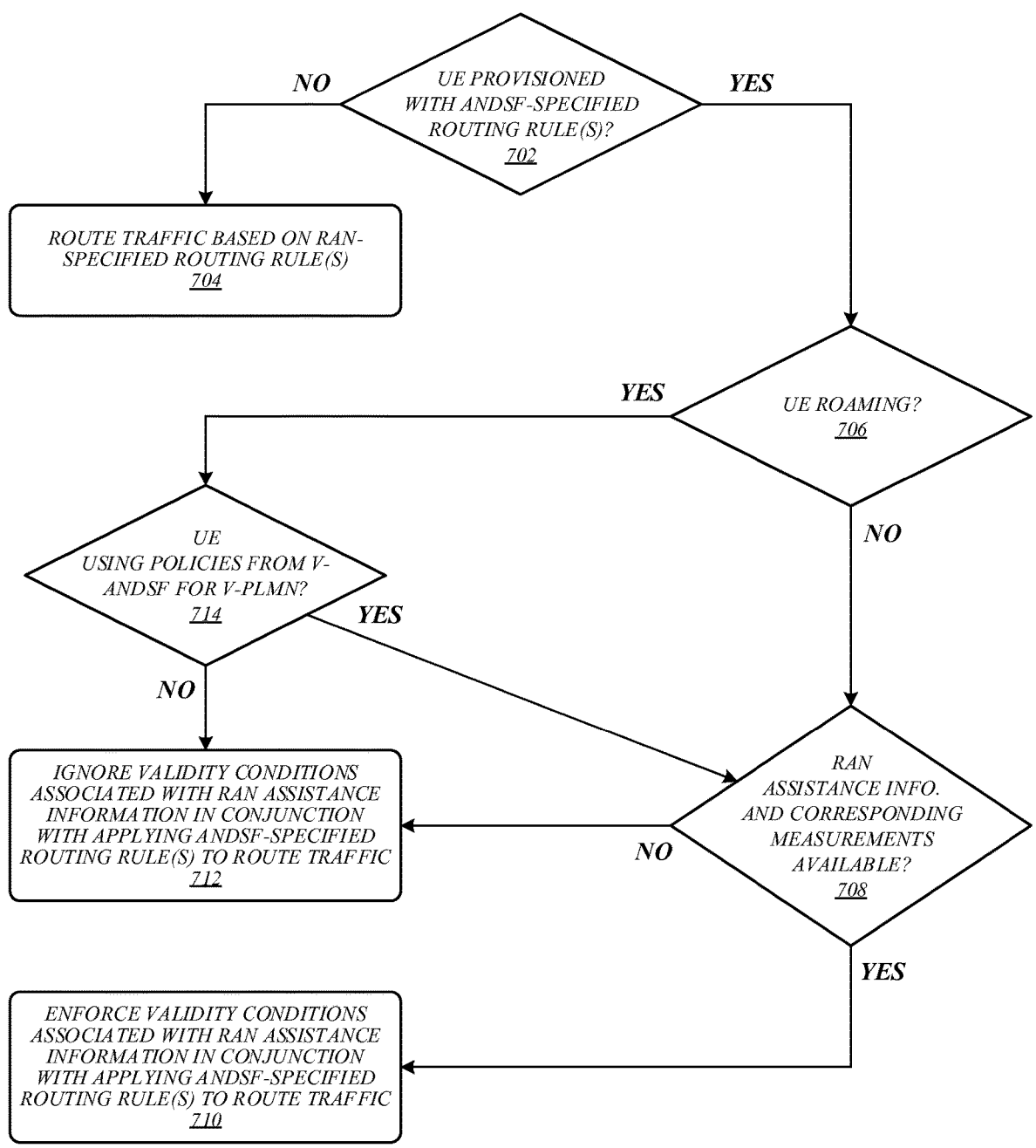
FIG. 7 illustrates an embodiment of a third logic flow.

FIG. 7 illustrates one embodiment of a logic flow 700, which may be representative of operations that may be performed in various embodiments in conjunction with the implementation of the disclosed techniques for coordinated application of wireless network selection and traffic routing rules. For example, logic flow 700 may be representative of operations that may be performed in some embodiments by UE 102 of FIGS. 1 and 2 during data communication phase 408 of FIG. 4. As shown in FIG. 7, at the beginning of logic flow 700, flow may pass from 702 based on whether the UE is provisioned with any ANDSF-specified routing rules. If the UE is not provisioned with any ANDSF-specified routing rules, flow may pass from 702 to 704, where the UE may route traffic based on one or more RAN-specified routing rules. For example, if UE 102 is configured with an ANDSF MO 222 that does not contain any ANDSF routing policies that comprise validity conditions to be evaluated based on RAN assistance information, UE 102 may route one or more IP traffic flows based on one or more RAN-specified routing rules. It is worthy of note that if the UE is configured with user preferences relating to traffic routing, the UE may route the one or more IP traffic flows based on those user preferences as well as the one or more RAN-specified rules, applying the one or more RAN-specified rules to the extent that they are not preempted by the user preferences. It is also worthy of note that in various embodiments, a UE may be provisioned neither with ANDSF-specified routing rules nor RAN-specified routing rules, and may route the traffic based simply on user preferences and/or other factors. The embodiments are not limited in this context.

If the UE is provisioned with one or more ANDSF-specified routing rules, flow may pass from 702 to 706. From 706, flow may proceed based on whether the UE is roaming. If the UE is not roaming, flow may pass from 706 to 708. From 708, flow may proceed based on whether the RAN assistance information on which the ANDSF-specified routing rules are based—as well as any necessary measurements corresponding to RAN thresholds defined by the RAN assistance information—are available. If the RAN assistance information and/or necessary measurements are available, flow may pass to 710, where one or more validity conditions associated with the RAN assistance information may be enforced in conjunction with applying the one or more ANDSF-specified routing rules to route traffic. For example, if UE 102 is configured with an ANDSF routing policy that comprises one or more validity conditions associated with RAN assistance information, and UE 102 successfully receives RAN assistance information 224 and successfully performs any measurements needed to evaluate those one or more validity conditions, then UE 102 may enforce the one or more validity conditions in conjunction with applying the ANDSF routing policy to route one or more IP traffic flows. If the RAN assistance information and/or necessary measurements are unavailable, flow may pass to 712, where validity conditions associated with the RAN assistance information may be ignored in conjunction with applying the one or more ANDSF-specified routing rules to route traffic. For example, if UE 102 is configured with an ANDSF routing policy that comprises one or more validity conditions associated with RAN assistance information, but UE 102 does not receive RAN assistance information 224 and/or is unable to perform measurements needed to evaluate those one or more validity conditions, then UE 102 may ignore the one or more validity conditions in conjunction with applying the ANDSF routing policy to route one or more IP traffic flows.

If the UE is roaming, then flow may pass from 706 to 714. From 714, flow may proceed based on whether the UE is using ANDSF policies provided by a V-ANDSF for its serving V-PLMN. In various embodiments, whether the UE is using ANDSF policies provided by the V-ANDSF server may depend on a preference of a home operator for the UE. In some embodiments, a parameter within an ANDSF MO for the UE may indicate whether the home operator prefers V-PLMN RAN thresholds. In various embodiments, for example, a PreferVPLMNRANThresholds parameter in the ANDSF MO for the UE may be set to a value of 1 when the home operator prefers V-PLMN RAN thresholds, and otherwise may be set to a value of 0. The embodiments are not limited to this example.

If the UE is using ANDSF policies provided by a V-ANDSF for its serving V-PLMN, flow may pass from 714 to 708, and may proceed from 708 in the manner previously described. If the UE is not using ANDSF policies provided by a V-ANDSF for its serving V-PLMN, flow may pass from 714 to 712, where validity conditions associated with the RAN assistance information may be ignored in conjunction with applying the one or more ANDSF-specified routing rules to route traffic. For example, if UE 102 is roaming but is configured to use H-ANDSF policies while roaming, then UE 102 may ignore any validity conditions associated with RAN assistance information in conjunction with applying an H-ANDSF routing policy to route one or more IP traffic flows. It is worthy of note that in some embodiments—as noted above—inter-operator coordination may be used to enable a UE to take an OPI bitmap provided by a V-PLMN RAN into account while applying an H-ANDSF routing policy. As such, in various embodiments, a UE that ignores one or more validity conditions associated with RAN assistance information in conjunction with applying an H-ANDSF routing policy at 712 may still apply a validity condition associated with an OPI bitmap. The embodiments are not limited in this context.

Returning to FIG. 2, in some embodiments, an ANDSF client at UE 102 may be responsible for the actual application of 3GPP access thresholds 226, WLAN access thresholds 228, and/or OPI 230 to evaluate ANDSF validity conditions that depend on them. In various such embodiments, a 3GPP access stratum (AS) at UE 102 may simply forward the relevant parameters in RAN assistance information 224 to the ANDSF client. In some other embodiments, the ANDSF client may instruct the 3GPP AS to notify the ANDSF client when it detects particular conditions relevant to evaluating such ANDSF validity conditions. For example, the ANDSF client may instruct the 3GPP AS to notify it if it measures an RSRP that is less than a value specified by a 3GPP access threshold 226. In such embodiments, RAN-related parameters may be kept within the 3GPP AS rather than needing to be forwarded to the ANDSF client, which may enable a reduction in the amount of data exchanged between the 3GPP AS and the ANDSF client. The embodiments are not limited in this context.

Figure 8:
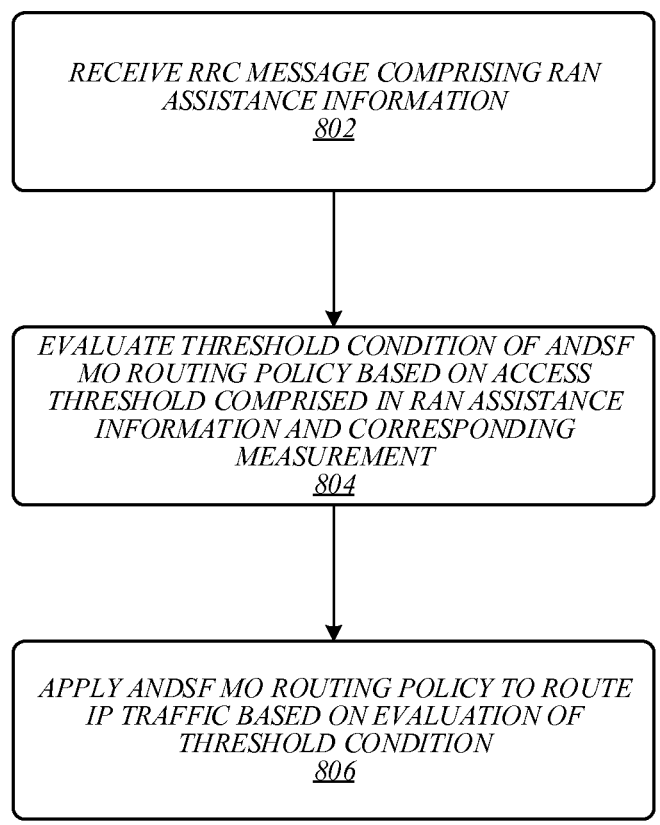
FIG. 8 illustrates an embodiment of a fourth logic flow.

FIG. 8 illustrates one embodiment of a logic flow 800, which may be representative of operations that may be performed in various embodiments in conjunction with the implementation of the disclosed techniques for coordinated application of wireless network selection and traffic routing rules. For example, logic flow 800 may be representative of operations that may be performed in some embodiments by UE 102 of FIGS. 1 and 2 during data communication phase 408 of FIG. 4. As shown in FIG. 8, a radio resource control (RRC) message comprising RAN assistance information may be received at 802. For example, in operating environment 200 of FIG. 2, UE 102 may receive an RRC message from eNB 104 that comprises RAN assistance information 224. At 804, a threshold condition of an ANDSF MO routing policy may be evaluated based on an access threshold comprised in the RAN assistance information and on a corresponding measurement. For example, in operating environment 200 of FIG. 2, UE 102 may evaluate a threshold condition of a routing policy comprised in ANDSF MO 222 based on a 3GPP or WLAN access threshold, such as an RSRP threshold, an RSRQ threshold, a BSS load threshold, or a backhaul data rate threshold, and on a corresponding measurement, such as an RSRP measurement, an RSRQ measurement, a BSS load measurement, or a backhaul data rate measurement. At 806, the ANDSF MO routing policy may be applied to route IP traffic based on the evaluation of the threshold condition. For example, in operating environment 200 of FIG. 2, UE 102 may route IP traffic based on an evaluation of a threshold condition of a routing policy comprised in ANDSF MO 222 based on a 3GPP or WLAN access threshold. The embodiments are not limited to these examples.

Figure 9:
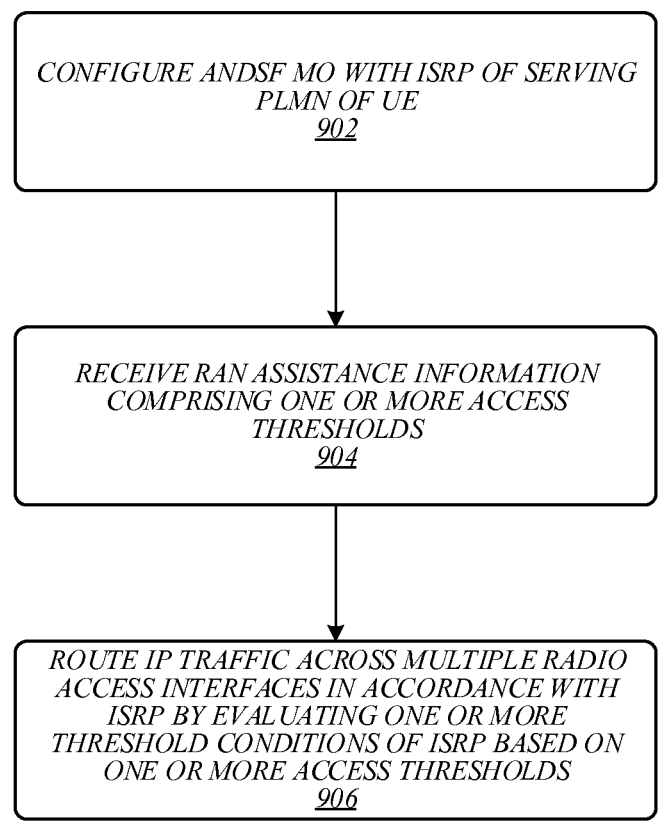
FIG. 9 illustrates an embodiment of a fifth logic flow.

FIG. 9 illustrates one embodiment of a logic flow 900, which may be representative of operations that may be performed in various embodiments in conjunction with the implementation of the disclosed techniques for coordinated application of wireless network selection and traffic routing rules. For example, logic flow 900 may be representative of operations that may be performed in some embodiments by UE 102 of FIGS. 1 and 2 during data communication phase 408 of FIG. 4. As shown in FIG. 9, an ANDSF MO may be configured with an ISRP of a serving PLMN of a UE at 902. For example, in operating environment 200 of FIG. 2, the ANDSF MO 222 for UE 102 may be configured with an ISRP of a serving PLMN of UE 102. At 904, RAN assistance information may be received that comprises one or more access thresholds. For example, in operating environment 200 of FIG. 2, UE 102 may receive RAN assistance information 224 that comprises one or more 3GPP access thresholds 226 and/or WLAN access thresholds 228. At 906, IP traffic may be routed across multiple radio access interfaces in accordance with the ISRP, by evaluating one or more threshold conditions of the ISRP based on the one or more access thresholds. For example, in operating environment 200 of FIG. 2, UE 102 may route IP traffic across a 3GPP RAN radio access interface and a WLAN radio access interface in accordance with an ISRP provisioned in ANDSF MO 222, by evaluating one or more threshold conditions of the ISRP based on one or more 3GPP access thresholds 226 and/or WLAN access thresholds 228 comprised in received RAN assistance information 224. The embodiments are not limited to these examples.

Figure 10:
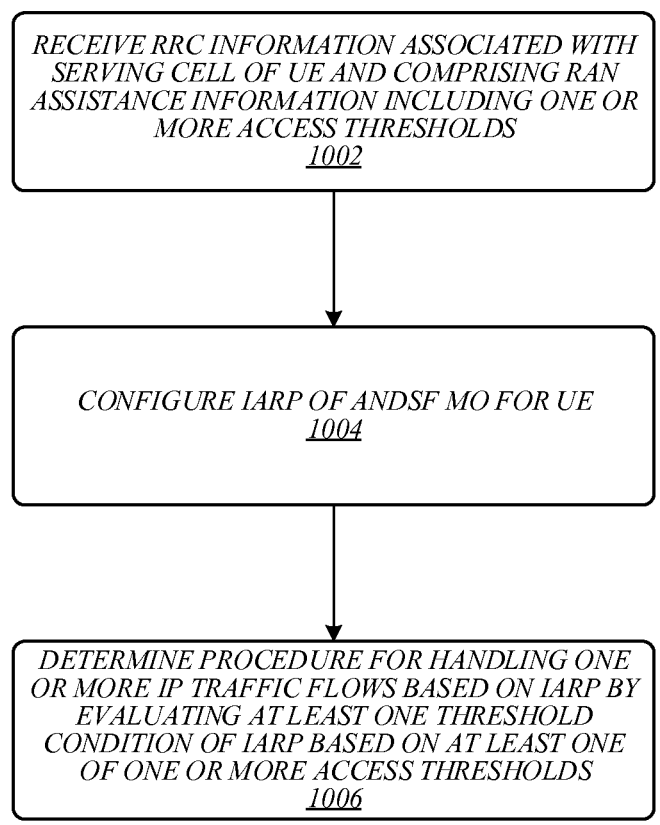
FIG. 10 illustrates an embodiment of a sixth logic flow.

FIG. 10 illustrates one embodiment of a logic flow 1000, which may be representative of operations that may be performed in various embodiments in conjunction with the implementation of the disclosed techniques for coordinated application of wireless network selection and traffic routing rules. For example, logic flow 1000 may be representative of operations that may be performed in some embodiments by UE 102 of FIGS. 1 and 2 during data communication phase 408 of FIG. 4. As shown in FIG. 10, RRC information associated with a serving cell of a UE and comprising RAN assistance information including one or more access thresholds may be received at 1002. For example, in operating environment 200 of FIG. 2, UE 102 may receive RRC information associated with its serving cell and comprising RAN assistance information 224 that comprises one or more 3GPP access thresholds 226 and/or WLAN access thresholds 228. At 1004, an IARP of an ANDSF MO for the UE may be configured. For example, in operating environment 200 of FIG. 2, an IARP of the ANDSF MO 222 for UE 102 may be configured. At 1006, a procedure for handling one or more IP traffic flows may be determined based on the IARP, by evaluating at least one threshold condition of the IARP based on at least one of the one or more access thresholds. For example, in operating environment 200 of FIG. 2, UE 102 may determine a procedure for handling one or more IP traffic flows based on an TARP provisioned in ANDSF MO 222, by evaluating at least one threshold condition of the TARP based on at least one of one or more 3GPP access thresholds 226 and/or WLAN access thresholds 228 comprised in received RAN assistance information 224. The embodiments are not limited to these examples.

Figure 11:
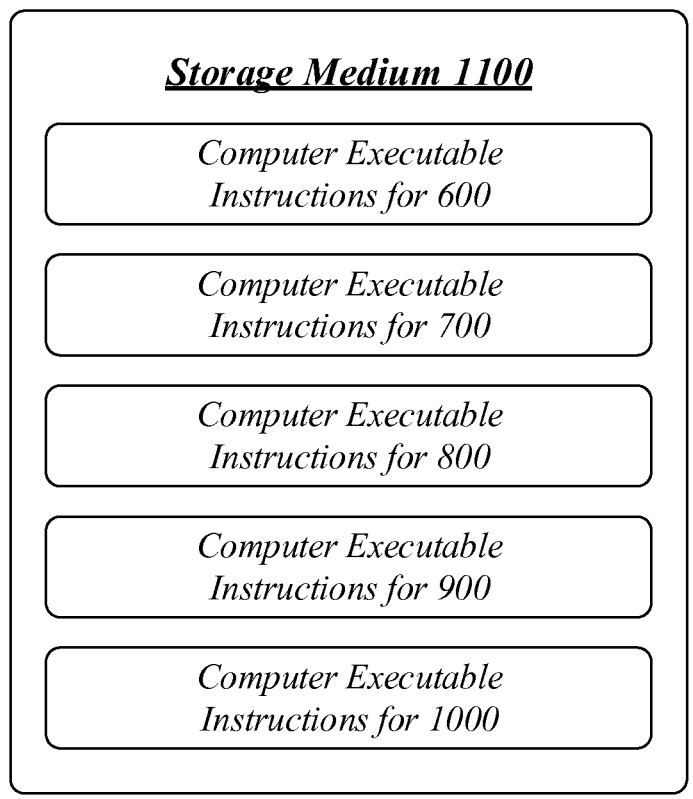
FIG. 11 illustrates an embodiment of a storage medium.

FIG. 11 illustrates an embodiment of a storage medium 1100. Storage medium 1100 may comprise any non-transitory computer-readable storage medium or machine-readable storage medium, such as an optical, magnetic or semiconductor storage medium. In various embodiments, storage medium 1100 may comprise an article of manufacture. In some embodiments, storage medium 1100 may store computer-executable instructions, such as computer-executable instructions to implement one or more of logic flow 600 of FIG. 6, logic flow 700 of FIG. 7, logic flow 800 of FIG. 8, logic flow 900 of FIG. 9, and logic flow 1000 of FIG. 10. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 12:
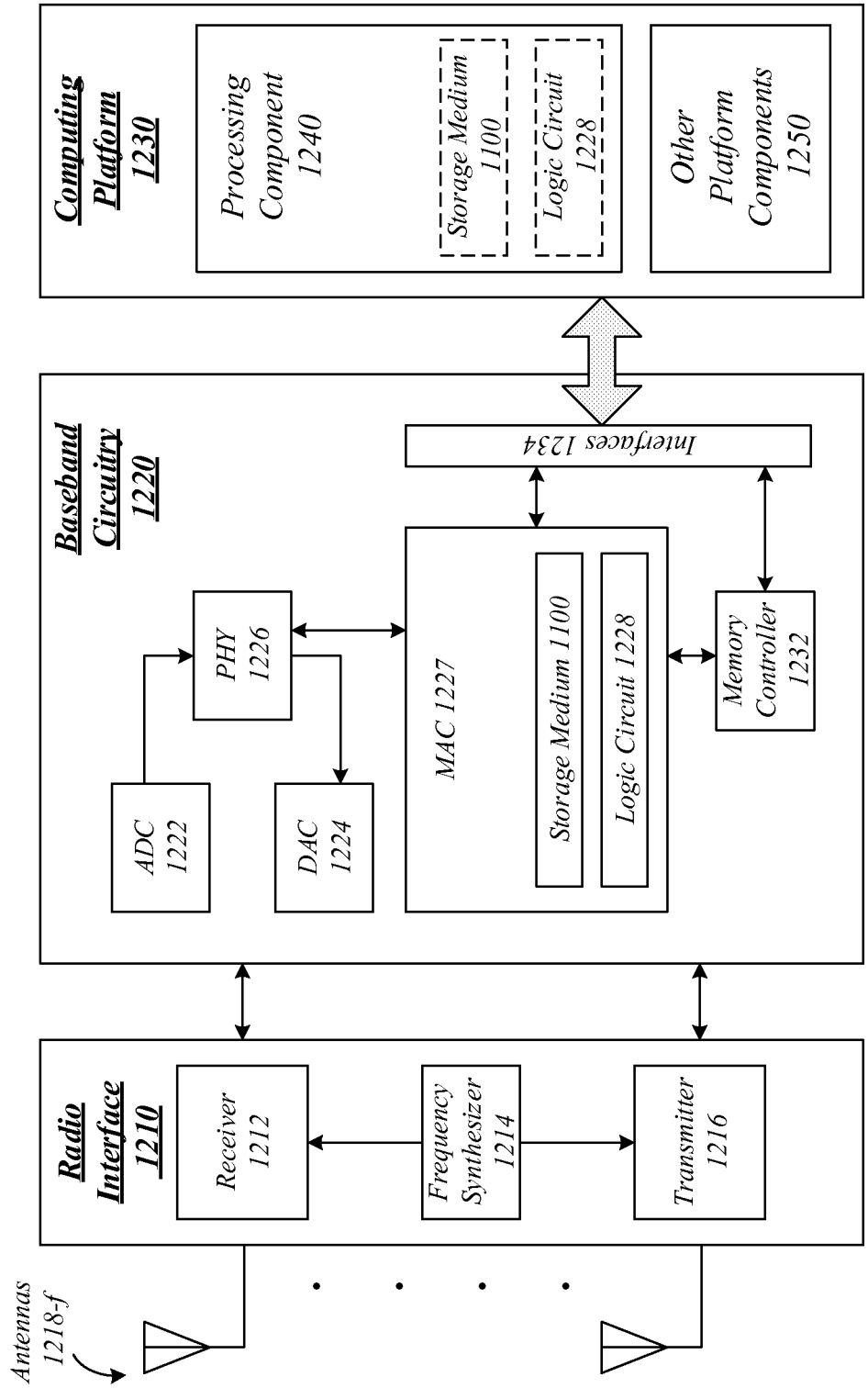
FIG. 12 illustrates an embodiment of a device.

FIG. 12 illustrates an embodiment of a communications device 1200 that may implement one or more of UE 102, eNB 104, and ANDSF server 108 of FIGS. 1 and 2, logic flow 600 of FIG. 6, logic flow 700 of FIG. 7, logic flow 800 of FIG. 8, logic flow 900 of FIG. 9, logic flow 1000 of FIG. 10, and storage medium 1100 of FIG. 11. In various embodiments, device 1200 may comprise a logic circuit 1228. The logic circuit 1228 may include physical circuits to perform operations described for one or more of UE 102, eNB 104, and ANDSF server 108 of FIGS. 1 and 2, logic flow 600 of FIG. 6, logic flow 700 of FIG. 7, logic flow 800 of FIG. 8, logic flow 900 of FIG. 9, and logic flow 1000 of FIG. 10, for example. As shown in FIG. 12, device 1200 may include a radio interface 1210, baseband circuitry 1220, and computing platform 1230, although the embodiments are not limited to this configuration.

The device 1200 may implement some or all of the structure and/or operations for one or more of UE 102, eNB 104, and ANDSF server 108 of FIGS. 1 and 2, logic flow 600 of FIG. 6, logic flow 700 of FIG. 7, logic flow 800 of FIG. 8, logic flow 900 of FIG. 9, logic flow 1000 of FIG. 10, storage medium 1100 of FIG. 11, and logic circuit 1228 in a single computing entity, such as entirely within a single device. Alternatively, the device 1200 may distribute portions of the structure and/or operations for one or more of UE 102, eNB 104, and ANDSF server 108 of FIGS. 1 and 2, logic flow 600 of FIG. 6, logic flow 700 of FIG. 7, logic flow 800 of FIG. 8, logic flow 900 of FIG. 9, logic flow 1000 of FIG. 10, storage medium 1100 of FIG. 11, and logic circuit 1228 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1210 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1210 may include, for example, a receiver 1212, a frequency synthesizer 1214, and/or a transmitter 1216. Radio interface 1210 may include bias controls, a crystal oscillator and/or one or more antennas 1218-*f*. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, a mixer for down-converting received radio frequency signals, an analog-to-digital converter 1222 for converting analog signals to a digital form, a digital-to-analog converter 1224 for converting digital signals to an analog form, and a mixer for up-converting signals for transmission. Further, baseband circuitry 1220 may include a baseband or physical layer (PHY) processing circuit 1226 for PHY link layer processing of respective receive/transmit signals. Baseband circuitry 1220 may include, for example, a medium access control (MAC) processing circuit 1227 for MAC/data link layer processing. Baseband circuitry 1220 may include a memory controller 1232 for communicating with MAC processing circuit 1227 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames. Alternatively or in addition, MAC processing circuit 1227 may share processing for certain of these functions or perform these processes independent of PHY processing circuit 1226. In some embodiments, MAC and PHY processing may be integrated into a single circuit.

The computing platform 1230 may provide computing functionality for the device 1200. As shown, the computing platform 1230 may include a processing component 1240. In addition to, or alternatively of, the baseband circuitry 1220, the device 1200 may execute processing operations or logic for one or more of UE 102, eNB 104, and ANDSF server 108 of FIGS. 1 and 2, logic flow 600 of FIG. 6, logic flow 700 of FIG. 7, logic flow 800 of FIG. 8, logic flow 900 of FIG. 9, logic flow 1000 of FIG. 10, storage medium 1100 of FIG. 11, and logic circuit 1228 using the processing component 1240. The processing component 1240 (and/or PHY 1226 and/or MAC 1227) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1200 described herein, may be included or omitted in various embodiments of device 1200, as suitably desired.

Embodiments of device 1200 may be implemented using single input single output (SISO) architectures. However, certain implementations may include multiple antennas (e.g., antennas 1218-*f*) for transmission and/or reception using adaptive antenna techniques for beamforming or spatial division multiple access (SDMA) and/or using MIMO communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 13:
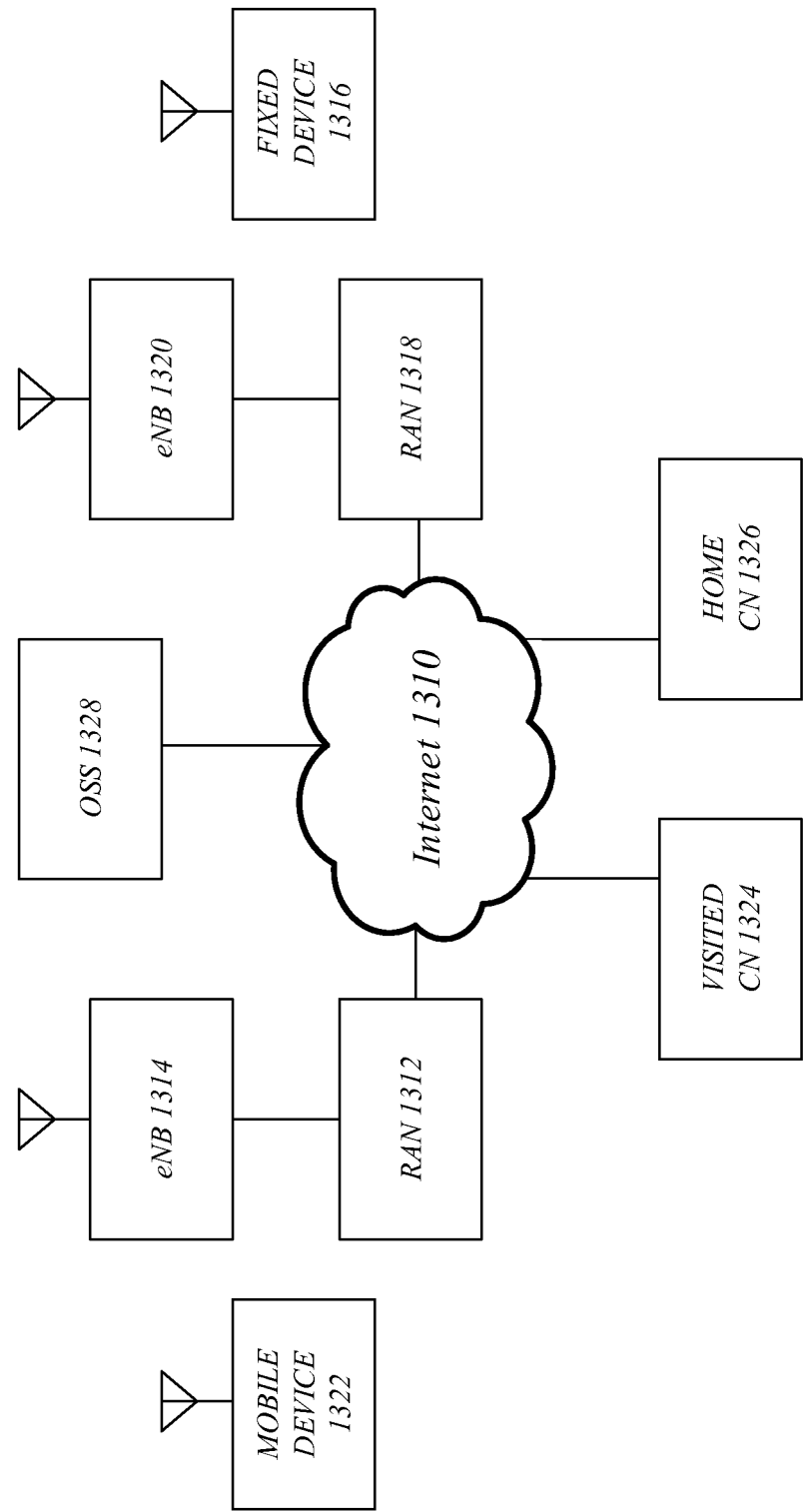
FIG. 13 illustrates an embodiment of wireless network.

FIG. 13 illustrates an embodiment of a broadband wireless access system 1300. As shown in FIG. 13, broadband wireless access system 1300 may be an internet protocol (IP) type network comprising an internet 1310 type network or the like that is capable of supporting mobile wireless access and/or fixed wireless access to internet 1310. In one or more embodiments, broadband wireless access system 1300 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1300, radio access networks (RANs) 1312 and 1318 are capable of coupling with evolved node Bs (eNBs) 1314 and 1320, respectively, to provide wireless communication between one or more fixed devices 1316 and internet 1310 and/or between or one or more mobile devices 1322 and Internet 1310. One example of a fixed device 1316 and a mobile device 1322 is device 1200 of FIG. 12, with the fixed device 1316 comprising a stationary version of device 1200 and the mobile device 1322 comprising a mobile version of device 1200. RANs 1312 and 1318 may implement profiles that are capable of defining the mapping of network functions to one or more physical entities on broadband wireless access system 1300. eNBs 1314 and 1320 may comprise radio equipment to provide RF communication with fixed device 1316 and/or mobile device 1322, such as described with reference to device 1200, and may comprise, for example, the PHY and MAC layer equipment in compliance with a 3GPP LTE Specification or an IEEE 802.16 Standard. eNBs 1314 and 1320 may further comprise an IP backplane to couple to Internet 1310 via RANs 1312 and 1318, respectively, although the scope of the claimed subject matter is not limited in these respects.

Broadband wireless access system 1300 may further comprise a visited core network (CN) 1324 and/or a home CN 1326, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1324 and/or home CN 1326, and the scope of the claimed subject matter is not limited in these respects. Visited CN 1324 may be referred to as a visited CN in the case where visited CN 1324 is not part of the regular service provider of fixed device 1316 or mobile device 1322, for example where fixed device 1316 or mobile device 1322 is roaming away from its respective home CN 1326, or where broadband wireless access system 1300 is part of the regular service provider of fixed device 1316 or mobile device 1322 but where broadband wireless access system 1300 may be in another location or state that is not the main or home location of fixed device 1316 or mobile device 1322. The embodiments are not limited in this context.

Fixed device 1316 may be located anywhere within range of one or both of eNBs 1314 and 1320, such as in or near a home or business to provide home or business customer broadband access to Internet 1310 via eNBs 1314 and 1320 and RANs 1312 and 1318, respectively, and home CN 1326. It is worthy of note that although fixed device 1316 is generally disposed in a stationary location, it may be moved to different locations as needed. Mobile device 1322 may be utilized at one or more locations if mobile device 1322 is within range of one or both of eNBs 1314 and 1320, for example. In accordance with one or more embodiments, operation support system (OSS) 1328 may be part of broadband wireless access system 1300 to provide management functions for broadband wireless access system 1300 and to provide interfaces between functional entities of broadband wireless access system 1300. Broadband wireless access system 1300 of FIG. 13 is merely one type of wireless network showing a certain number of the components of broadband wireless access system 1300, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising logic, at least a portion of which is in hardware, the logic to process a received radio resource control (RRC) message comprising radio access network (RAN) assistance information, evaluate a threshold condition of an access network discovery and selection function (ANDSF) management object (MO) routing policy based on an access threshold comprised in the RAN assistance information and a corresponding measurement, and apply the ANDSF MO routing policy to route internet protocol (IP) traffic based on the evaluation of the threshold condition.

Example 2 is the apparatus of Example 1, the logic to evaluate an offload preference indicator (OPI) condition of the ANDSF MO routing policy based on an OPI comprised in the RAN assistance information and apply the ANDSF MO routing policy to route the IP traffic based on the evaluation of the OPI condition and the evaluation of the threshold condition.

Example 3 is the apparatus of Example 1, the ANDSF MO routing policy to comprise an inter-system routing policy (ISRP).

Example 4 is the apparatus of Example 1, the ANDSF MO routing policy to comprise an inter-access point name routing policy (TARP).

Example 5 is the apparatus of Example 1, the access threshold to comprise a reference signal received power (RSRP) threshold.

Example 6 is the apparatus of Example 1, the access threshold to comprise a reference signal received quality (RSRQ) threshold.

Example 7 is the apparatus of Example 1, the access threshold to comprise a basic service set (BSS) load threshold or a backhaul threshold.

Example 8 is the apparatus of Example 1, the logic to ignore one or more RAN rules in conjunction with applying the ANDSF MO routing policy.

Example 9 is user equipment (UE), comprising an apparatus according to any of Examples 1 to 8, at least one radio frequency (RF) transceiver, and at least one RF antenna.

Example 10 is the UE of Example 9, comprising at least one memory unit, and a touchscreen display.

Example 11 is at least one non-transitory computer-readable storage medium comprising a set of instructions that, in response to being executed at user equipment (UE), cause the UE to configure an access network discovery and selection function (ANDSF) management object (MO) with an inter-system routing policy (ISRP) of a serving public land mobile network (PLMN) of the UE, process received radio access network (RAN) assistance information comprising one or more access thresholds, and route internet protocol (IP) traffic across multiple radio access interfaces in accordance with the ISRP by evaluating one or more threshold conditions of the ISRP based on the one or more access thresholds.

Example 12 is the at least one non-transitory computer-readable storage medium of Example 11, comprising instructions that, in response to being executed at the UE, cause the UE to configure the ANDSF MO based on ANDSF information originating from an ANDSF server for the serving PLMN.

Example 13 is the at least one non-transitory computer-readable storage medium of Example 11, the multiple radio access interfaces to include a 3rd Generation Partnership Project (3GPP) radio access interface and a wireless local area network (WLAN) radio access interface.

Example 14 is the at least one non-transitory computer-readable storage medium of Example 11, the one or more access thresholds to include one or more reference signal received power (RSRP) thresholds.

Example 15 is the at least one non-transitory computer-readable storage medium of Example 11, the one or more access thresholds to include one or more reference signal received quality (RSRQ) thresholds.

Example 16 is the at least one non-transitory computer-readable storage medium of Example 11, the one or more access thresholds to include one or more basic service set (BSS) load thresholds.

Example 17 is the at least one non-transitory computer-readable storage medium of Example 11, the one or more access thresholds to include one or more backhaul thresholds.

Example 18 is the at least one non-transitory computer-readable storage medium of Example 11, comprising instructions that, in response to being executed at the UE, cause the UE to route the IP traffic across the multiple radio access interfaces according to the ISRP by evaluating the one or more threshold conditions of the ISRP based on the one or more access thresholds and evaluating an offload preference indicator (OPI) condition of the ISRP based on an OPI comprised in the RAN assistance information.

Example 19 a wireless communication method, comprising processing, by processing circuitry at user equipment (UE), radio resource control (RRC) information associated with a serving cell of the UE, the RRC information to comprise radio access network (RAN) assistance information including one or more access thresholds, configuring a routing policy of an access network discovery and selection function (ANDSF) management object (MO) for the UE, and determining a procedure for handling one or more internet protocol (IP) traffic flows based on the routing policy by identifying a corresponding measurement for at least one access threshold and comparing the at least one access threshold to its corresponding measurement.

Example 20 is the wireless communication method of Example 19, the one or more access thresholds to include one or more reference signal received power (RSRP) thresholds.

Example 21 is the wireless communication method of Example 19, the one or more access thresholds to include one or more reference signal received quality (RSRQ) thresholds.

Example 22 is the wireless communication method of Example 19, the one or more access thresholds to include one or more basic service set (BSS) load thresholds.

Example 23 is the wireless communication method of Example 19, the one or more access thresholds to include one or more backhaul thresholds.

Example 24 is the wireless communication method of Example 19, the determined procedure to comprise routing IP traffic across multiple packet data network (PDN) connections.

Example 25 is the wireless communication method of Example 19, the determined procedure to comprise non-seamlessly offloading IP traffic to a wireless local area network (WLAN).

Example 26 is the wireless communication method of Example 19, the logic to configure the routing policy based on ANDSF information received via an S14 interface.

Example 27 is at least one non-transitory computer-readable storage medium comprising a set of instructions that, in response to being executed on a computing device, cause the computing device to perform a wireless communication method according to any of Examples 19 to 26.

Example 28 is an apparatus, comprising means for performing a wireless communication method according to any of Examples 19 to 26.

Example 29 is a system, comprising the apparatus of Example 29, at least one radio frequency (RF) transceiver, and at least one RF antenna.

Example 30 is the system of Example 29, comprising at least one memory unit, and a touchscreen display.

Example 31 is an apparatus, comprising means for processing received device capability information for user equipment (UE) to determine whether the UE supports use of radio access network (RAN) thresholds in ANDSF routing policies, and means for configuring an ANDSF management object (MO) for the UE with an ANDSF routing policy that includes one or more RAN threshold-based ANDSF rules in response to a determination that the UE supports use of RAN thresholds in ANDSF routing policies.

Example 32 is the apparatus of Example 31, comprising means for configuring the ANDSF MO for the UE with an ANDSF routing policy that does not include any RAN threshold-based ANDSF rules in response to a determination that the UE does not support use of RAN thresholds in ANDSF routing policies.

Example 33 is the apparatus of Example 31, comprising means for setting a parameter within the ANDSF MO for the UE to indicate whether a home operator for the UE prefers visited public land mobile network (V-PLMN) RAN thresholds.

Example 34 is the apparatus of Example 31, the ANDSF routing policy to comprise an inter-system routing policy (ISRP).

Example 35 is the apparatus of Example 31, the ANDSF routing policy to comprise an inter-access point name routing policy (TARP).

Example 36 is a system, comprising an apparatus according to any of Examples 31 to 35, at least one processor, and at least one memory unit.

Example 37 is the system of Example 36, comprising at least one radio frequency (RF) transceiver, and at least one RF antenna.

Example 38 is at least one non-transitory computer-readable storage medium comprising a set of instructions that, in response to being executed at user equipment (UE), cause the UE to process radio resource control (RRC) information associated with a serving cell of the UE, the RRC information to comprise radio access network (RAN) assistance information including one or more access thresholds, configure a routing policy of an access network discovery and selection function (ANDSF) management object (MO) for the UE, and determine a procedure for handling one or more internet protocol (IP) traffic flows based on the routing policy by identifying a corresponding measurement for at least one access threshold and comparing the at least one access threshold to its corresponding measurement.

Example 39 is the at least one non-transitory computer-readable storage medium of Example 38, the one or more access thresholds to include one or more reference signal received power (RSRP) thresholds.

Example 40 is the at least one non-transitory computer-readable storage medium of Example 38, the one or more access thresholds to include one or more reference signal received quality (RSRQ) thresholds.

Example 41 is the at least one non-transitory computer-readable storage medium of Example 38, the one or more access thresholds to include one or more basic service set (BSS) load thresholds.

Example 42 is the at least one non-transitory computer-readable storage medium of Example 38, the one or more access thresholds to include one or more backhaul thresholds.

Example 43 is the at least one non-transitory computer-readable storage medium of Example 38, the determined procedure to comprise routing IP traffic across multiple packet data network (PDN) connections.

Example 44 is the at least one non-transitory computer-readable storage medium of Example 38, the determined procedure to comprise non-seamlessly offloading IP traffic to a wireless local area network (WLAN).

Example 45 is the at least one non-transitory computer-readable storage medium of Example 38, the logic to configure the routing policy based on ANDSF information received via an S14 interface.

Example 46 is a wireless communication method, comprising processing, by processing circuitry at an access network discovery and selection function (ANDSF) server, received device capability information for user equipment (UE) to determine whether the UE supports use of radio access network (RAN) thresholds in ANDSF routing policies, and in response to a determination that the UE supports use of RAN thresholds in ANDSF routing policies, configuring an ANDSF management object (MO) for the UE with an ANDSF routing policy that includes one or more RAN threshold-based ANDSF rules.

Example 47 is the wireless communication method of Example 46, comprising configuring the ANDSF MO for the UE with an ANDSF routing policy that does not include any RAN threshold-based ANDSF rules in response to a determination that the UE does not support use of RAN thresholds in ANDSF routing policies.

Example 48 is the wireless communication method of Example 46, comprising setting a parameter within the ANDSF MO for the UE to indicate whether a home operator for the UE prefers visited public land mobile network (V-PLMN) RAN thresholds.

Example 49 is the wireless communication method of Example 46, the ANDSF routing policy to comprise an inter-system routing policy (ISRP).

Example 50 is the wireless communication method of Example 46, the ANDSF routing policy to comprise an inter-access point name routing policy (TARP).

Example 51 is at least one non-transitory computer-readable storage medium comprising a set of instructions that, in response to being executed on a computing device, cause the computing device to perform a wireless communication method according to any of Examples 46 to 50.

Example 52 is an apparatus, comprising means for performing a wireless communication method according to any of Examples 46 to 50.

Example 53 is a system, comprising the apparatus of Example 52, at least one processor, and at least one memory unit.

Example 54 is the system of Example 53, comprising at least one radio frequency (RF) transceiver, and at least one RF antenna.

Example 55 is an apparatus, comprising means for processing a received radio resource control (RRC) message comprising radio access network (RAN) assistance information, means for evaluating a threshold condition of an access network discovery and selection function (ANDSF) management object (MO) routing policy based on an access threshold comprised in the RAN assistance information and a corresponding measurement, and means for applying the ANDSF MO routing policy to route internet protocol (IP) traffic based on the evaluation of the threshold condition.

Example 56 is the apparatus of Example 55, comprising means for evaluating an offload preference indicator (OPI) condition of the ANDSF MO routing policy based on an OPI comprised in the RAN assistance information, and means for applying the ANDSF MO routing policy to route the IP traffic based on the evaluation of the OPI condition and the evaluation of the threshold condition.

Example 57 is the apparatus of Example 55, the ANDSF MO routing policy to comprise an inter-system routing policy (ISRP).

Example 58 is the apparatus of Example 55, the ANDSF MO routing policy to comprise an inter-access point name routing policy (TARP).

Example 59 is the apparatus of Example 55, the access threshold to comprise a reference signal received power (RSRP) threshold.

Example 60 is the apparatus of Example 55, the access threshold to comprise a reference signal received quality (RSRQ) threshold.

Example 61 is the apparatus of Example 55, the access threshold to comprise a basic service set (BSS) load threshold or a backhaul threshold.

Example 62 is the apparatus of Example 55, comprising means for ignoring one or more RAN rules in conjunction with applying the ANDSF MO routing policy.

Example 63 is a system, comprising an apparatus according to any of Examples 55 to 62, at least one radio frequency (RF) transceiver, and at least one RF antenna.

Example 64 is the system of Example 63, comprising at least one memory unit, and a touchscreen display.

Example 65 is an apparatus, comprising logic, at least a portion of which is in hardware, the logic to configure an access network discovery and selection function (ANDSF) management object (MO) with an inter-system routing policy (ISRP) of a serving public land mobile network (PLMN) of user equipment (UE), process received radio access network (RAN) assistance information comprising one or more access thresholds, and route internet protocol (IP) traffic across multiple radio access interfaces in accordance with the ISRP by evaluating one or more threshold conditions of the ISRP based on the one or more access thresholds.

Example 66 is the apparatus of Example 65, the logic to configure the ANDSF MO based on ANDSF information originating from an ANDSF server for the serving PLMN.

Example 67 is the apparatus of Example 65, the multiple radio access interfaces to include a 3rd Generation Partnership Project (3GPP) radio access interface and a wireless local area network (WLAN) radio access interface.

Example 68 is the apparatus of Example 65, the one or more access thresholds to include one or more reference signal received power (RSRP) thresholds.

Example 69 is the apparatus of Example 65, the one or more access thresholds to include one or more reference signal received quality (RSRQ) thresholds.

Example 70 is the apparatus of Example 65, the one or more access thresholds to include one or more basic service set (BSS) load thresholds.

Example 71 is the apparatus of Example 65, the one or more access thresholds to include one or more backhaul thresholds.

Example 72 is the apparatus of Example 65, the logic to route the IP traffic across the multiple radio access interfaces according to the ISRP by evaluating the one or more threshold conditions of the ISRP based on the one or more access thresholds and evaluating an offload preference indicator (OPI) condition of the ISRP based on an OPI comprised in the RAN assistance information.

Example 73 is a system, comprising an apparatus according to any of Examples 65 to 72, at least one radio frequency (RF) transceiver, and at least one RF antenna.

Example 74 is the system of Example 73, comprising at least one memory unit, and a touchscreen display.

Example 75 is a wireless communication method, comprising processing, by processing circuitry at user equipment (UE), a received radio resource control (RRC) message comprising radio access network (RAN) assistance information, evaluating a threshold condition of an access network discovery and selection function (ANDSF) management object (MO) routing policy based on an access threshold comprised in the RAN assistance information and a corresponding measurement, and applying the ANDSF MO routing policy to route internet protocol (IP) traffic based on the evaluation of the threshold condition.

Example 76 is the wireless communication method of Example 75, comprising evaluating an offload preference indicator (OPI) condition of the ANDSF MO routing policy based on an OPI comprised in the RAN assistance information, and applying the ANDSF MO routing policy to route the IP traffic based on the evaluation of the OPI condition and the evaluation of the threshold condition.

Example 77 is the wireless communication method of Example 75, the ANDSF MO routing policy to comprise an inter-system routing policy (ISRP).

Example 78 is the wireless communication method of Example 75, the ANDSF MO routing policy to comprise an inter-access point name routing policy (IARP).

Example 79 is the wireless communication method of Example 75, the access threshold to comprise a reference signal received power (RSRP) threshold.

Example 80 is the wireless communication method of Example 75, the access threshold to comprise a reference signal received quality (RSRQ) threshold.

Example 81 is the wireless communication method of Example 75, the access threshold to comprise a basic service set (BSS) load threshold or a backhaul threshold.

Example 82 is the wireless communication method of Example 75, comprising ignoring one or more RAN rules in conjunction with applying the ANDSF MO routing policy.

Example 83 is at least one non-transitory computer-readable storage medium comprising a set of instructions that, in response to being executed on a computing device, cause the computing device to perform a wireless communication method according to any of Examples 75 to 82.

Example 84 is an apparatus, comprising means for performing a wireless communication method according to any of Examples 75 to 82.

Example 85 is a system, comprising the apparatus of Example 84, at least one radio frequency (RF) transceiver, and at least one RF antenna.

Example 86 is the system of Example 85, comprising at least one memory unit, and a touchscreen display.

Example 87 is an apparatus, comprising means for configuring an access network discovery and selection function (ANDSF) management object (MO) with an inter-system routing policy (ISRP) of a serving public land mobile network (PLMN) of user equipment (UE), means for processing received radio access network (RAN) assistance information comprising one or more access thresholds, and means for routing internet protocol (IP) traffic across multiple radio access interfaces in accordance with the ISRP by evaluating one or more threshold conditions of the ISRP based on the one or more access thresholds.

Example 88 is the apparatus of Example 87, comprising means for configuring the ANDSF MO based on ANDSF information originating from an ANDSF server for the serving PLMN.

Example 89 is the apparatus of Example 87, the multiple radio access interfaces to include a 3rd Generation Partnership Project (3GPP) radio access interface and a wireless local area network (WLAN) radio access interface.

Example 90 is the apparatus of Example 87, the one or more access thresholds to include one or more reference signal received power (RSRP) thresholds.

Example 91 is the apparatus of Example 87, the one or more access thresholds to include one or more reference signal received quality (RSRQ) thresholds.

Example 92 is the apparatus of Example 87, the one or more access thresholds to include one or more basic service set (BSS) load thresholds.

Example 93 is the apparatus of Example 87, the one or more access thresholds to include one or more backhaul thresholds.

Example 94 is the apparatus of Example 87, comprising means for routing the IP traffic across the multiple radio access interfaces according to the ISRP by evaluating the one or more threshold conditions of the ISRP based on the one or more access thresholds and evaluating an offload preference indicator (OPI) condition of the ISRP based on an OPI comprised in the RAN assistance information.

Example 95 is a system, comprising an apparatus according to any of Examples 87 to 94, at least one radio frequency (RF) transceiver, and at least one RF antenna.

Example 96 is the system of Example 95, comprising at least one memory unit, and a touchscreen display.

Example 97 is an apparatus, comprising logic, at least a portion of which is in hardware, the logic to process radio resource control (RRC) information associated with a serving cell of user equipment (UE), the RRC information to comprise radio access network (RAN) assistance information including one or more access thresholds, the logic to configure a routing policy of an access network discovery and selection function (ANDSF) management object (MO) for the UE and determine a procedure for handling one or more internet protocol (IP) traffic flows based on the routing policy by identifying a corresponding measurement for at least one access threshold and comparing the at least one access threshold to its corresponding measurement.

Example 98 is the apparatus of Example 97, the one or more access thresholds to include one or more reference signal received power (RSRP) thresholds.

Example 99 is the apparatus of Example 97, the one or more access thresholds to include one or more reference signal received quality (RSRQ) thresholds.

Example 100 is the apparatus of Example 97, the one or more access thresholds to include one or more basic service set (BSS) load thresholds.

Example 101 is the apparatus of Example 97, the one or more access thresholds to include one or more backhaul thresholds.

Example 102 is the apparatus of Example 97, the determined procedure to comprise routing IP traffic across multiple packet data network (PDN) connections.

Example 103 is the apparatus of Example 97, the determined procedure to comprise non-seamlessly offloading IP traffic to a wireless local area network (WLAN).

Example 104 is the apparatus of Example 97, the logic to configure the routing policy based on ANDSF information received via an S14 interface.

Example 105 is a system, comprising an apparatus according to any of Examples 97 to 104, at least one radio frequency (RF) transceiver, and at least one RF antenna.

Example 106 is the system of Example 105, comprising at least one memory unit, and a touchscreen display.

Example 107 is at least one non-transitory computer-readable storage medium comprising a set of instructions that, in response to being executed on a computing device, cause the computing device to process received device capability information for user equipment (UE) to determine whether the UE supports use of radio access network (RAN) thresholds in access network discovery and selection function (ANDSF) routing policies, and in response to a determination that the UE supports use of RAN thresholds in ANDSF routing policies, configure an ANDSF management object (MO) for the UE with an ANDSF routing policy that includes one or more RAN threshold-based ANDSF rules.

Example 108 is the at least one non-transitory computer-readable storage medium of Example 107, comprising instructions that, in response to being executed on the computing device, cause the computing device to configure the ANDSF MO for the UE with an ANDSF routing policy that does not include any RAN threshold-based ANDSF rules in response to a determination that the UE does not support use of RAN thresholds in ANDSF routing policies.

Example 109 is the at least one non-transitory computer-readable storage medium of Example 107, comprising instructions that, in response to being executed on the computing device, cause the computing device to set a parameter within the ANDSF MO for the UE to indicate whether a home operator for the UE prefers visited public land mobile network (V-PLMN) RAN thresholds.

Example 110 is the at least one non-transitory computer-readable storage medium of Example 107, the ANDSF routing policy to comprise an inter-system routing policy (ISRP).

Example 111 is the at least one non-transitory computer-readable storage medium of Example 107, the ANDSF routing policy to comprise an inter-access point name routing policy (TARP).

Example 112 is an apparatus, comprising means for processing radio resource control (RRC) information associated with a serving cell of user equipment (UE), the RRC information to comprise radio access network (RAN) assistance information including one or more access thresholds, means for configuring a routing policy of an access network discovery and selection function (ANDSF) management object (MO) for the UE, and means for determining a procedure for handling one or more internet protocol (IP) traffic flows based on the routing policy by identifying a corresponding measurement for at least one access threshold and comparing the at least one access threshold to its corresponding measurement.

Example 113 is the apparatus of Example 112, the one or more access thresholds to include one or more reference signal received power (RSRP) thresholds.

Example 114 is the apparatus of Example 112, the one or more access thresholds to include one or more reference signal received quality (RSRQ) thresholds.

Example 115 is the apparatus of Example 112, the one or more access thresholds to include one or more basic service set (BSS) load thresholds.

Example 116 is the apparatus of Example 112, the one or more access thresholds to include one or more backhaul thresholds.

Example 117 is the apparatus of Example 112, the determined procedure to comprise routing IP traffic across multiple packet data network (PDN) connections.

Example 118 is the apparatus of Example 112, the determined procedure to comprise non-seamlessly offloading IP traffic to a wireless local area network (WLAN).

Example 119 is the apparatus of Example 112, the logic to configure the routing policy based on ANDSF information received via an S14 interface.

Example 120 is a system, comprising an apparatus according to any of Examples 112 to 119, at least one radio frequency (RF) transceiver, and at least one RF antenna.

Example 121 is the system of Example 120, comprising at least one memory unit, and a touchscreen display.

Example 122 is an apparatus, comprising logic, at least a portion of which is in hardware, the logic to process received device capability information for user equipment (UE) to determine whether the UE supports use of radio access network (RAN) thresholds in access network discovery and selection function (ANDSF) routing policies and in response to a determination that the UE supports use of RAN thresholds in ANDSF routing policies, configure an ANDSF management object (MO) for the UE with an ANDSF routing policy that includes one or more RAN threshold-based ANDSF rules.

Example 123 is the apparatus of Example 122, the logic to configure the ANDSF MO for the UE with an ANDSF routing policy that does not include any RAN threshold-based ANDSF rules in response to a determination that the UE does not support use of RAN thresholds in ANDSF routing policies.

Example 124 is the apparatus of Example 122, the logic to set a parameter within the ANDSF MO for the UE to indicate whether a home operator for the UE prefers visited public land mobile network (V-PLMN) RAN thresholds.

Example 125 is the apparatus of Example 122, the ANDSF routing policy to comprise an inter-system routing policy (ISRP).

Example 126 is the apparatus of Example 122, the ANDSF routing policy to comprise an inter-access point name routing policy (TARP).

Example 127 is a system, comprising an apparatus according to any of Examples 122 to 126, at least one processor, and at least one memory unit.

Example 128 is the system of Example 127, comprising at least one radio frequency (RF) transceiver, and at least one RF antenna.

Example 129 is at least one non-transitory computer-readable storage medium comprising a set of instructions that, in response to being executed at user equipment (UE), cause the UE to process a received radio resource control (RRC) message comprising radio access network (RAN) assistance information, evaluate a threshold condition of an access network discovery and selection function (ANDSF) management object (MO) routing policy based on an access threshold comprised in the RAN assistance information and a corresponding measurement, and apply the ANDSF MO routing policy to route internet protocol (IP) traffic based on the evaluation of the threshold condition.

Example 130 is the at least one non-transitory computer-readable storage medium of Example 129, comprising instructions that, in response to being executed at the UE, cause the UE to evaluate an offload preference indicator (OPI) condition of the ANDSF MO routing policy based on an OPI comprised in the RAN assistance information, and apply the ANDSF MO routing policy to route the IP traffic based on the evaluation of the OPI condition and the evaluation of the threshold condition.

Example 131 is the at least one non-transitory computer-readable storage medium of Example 129, the ANDSF MO routing policy to comprise an inter-system routing policy (ISRP).

Example 132 is the at least one non-transitory computer-readable storage medium of Example 129, the ANDSF MO routing policy to comprise an inter-access point name routing policy (TARP).

Example 133 is the at least one non-transitory computer-readable storage medium of Example 129, the access threshold to comprise a reference signal received power (RSRP) threshold.

Example 134 is the at least one non-transitory computer-readable storage medium of Example 129, the access threshold to comprise a reference signal received quality (RSRQ) threshold.

Example 135 is the at least one non-transitory computer-readable storage medium of Example 129, the access threshold to comprise a basic service set (BSS) load threshold or a backhaul threshold.

Example 136 is the at least one non-transitory computer-readable storage medium of Example 129, comprising instructions that, in response to being executed at the UE, cause the UE to ignore one or more RAN rules in conjunction with applying the ANDSF MO routing policy.

Example 137 is a wireless communication method, comprising configuring, at user equipment (UE), an access network discovery and selection function (ANDSF) management object (MO) with an inter-system routing policy (ISRP) of a serving public land mobile network (PLMN) of the UE, processing, by processing circuitry of the UE, received radio access network (RAN) assistance information comprising one or more access thresholds, and routing internet protocol (IP) traffic across multiple radio access interfaces in accordance with the ISRP by evaluating one or more threshold conditions of the ISRP based on the one or more access thresholds.

Example 138 is the wireless communication method of Example 137, comprising configuring the ANDSF MO based on ANDSF information originating from an ANDSF server for the serving PLMN.

Example 139 is the wireless communication method of Example 137, the multiple radio access interfaces to include a 3rd Generation Partnership Project (3GPP) radio access interface and a wireless local area network (WLAN) radio access interface.

Example 140 is the wireless communication method of Example 137, the one or more access thresholds to include one or more reference signal received power (RSRP) thresholds.

Example 141 is the wireless communication method of Example 137, the one or more access thresholds to include one or more reference signal received quality (RSRQ) thresholds.

Example 142 is the wireless communication method of Example 137, the one or more access thresholds to include one or more basic service set (BSS) load thresholds.

Example 143 is the wireless communication method of Example 137, the one or more access thresholds to include one or more backhaul thresholds.

Example 144 is the wireless communication method of Example 137, comprising routing the IP traffic across the multiple radio access interfaces according to the ISRP by evaluating the one or more threshold conditions of the ISRP based on the one or more access thresholds and evaluating an offload preference indicator (OPI) condition of the ISRP based on an OPI comprised in the RAN assistance information.

Example 145 is at least one non-transitory computer-readable storage medium comprising a set of instructions that, in response to being executed on a computing device, cause the computing device to perform a wireless communication method according to any of Examples 137 to 144.

Example 146 is an apparatus, comprising means for performing a wireless communication method according to any of Examples 137 to 144.

Example 147 is a system, comprising the apparatus of Example 146, at least one radio frequency (RF) transceiver, and at least one RF antenna.

Example 148 is the system of Example 147, comprising at least one memory unit, and a touchscreen display.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. User equipment (UE), comprising:
   at least one radio frequency (RF) transceiver;
   at least one RF antenna; and logic, at least a portion of which is in hardware, the logic to:
   use home access network discovery and selection function (H-ANDSF) policies in a visited public land mobile network (V-PLMN);
   ignore one or more validity conditions associated with radio access network (RAN) assistance information in conjunction with applying an H-ANDSF routing policy to route one or more internet protocol (IP) traffic flows when the UE is operating in the V-PLMN; and
   apply a validity condition associated with an offload preference indicator (OPI) bitmap provided by the V-PLMN while applying the H-ANDSF routing policy.

2. The UE of claim 1, the logic to process a radio resource control (RRC) information associated with a serving cell of the UE, the RRC information to comprise the RAN assistance information including one or more access thresholds.

3. The UE of claim 2, the one or more access thresholds to include one or more reference signal received power (RSRP) thresholds.

4. The UE of claim 2, the one or more access thresholds to include one or more reference signal received quality (RSRQ) thresholds.

5. The UE of claim 2, the one or more access thresholds to include one or more basic service set (BSS) load thresholds.

6. The UE of claim 2, the one or more access thresholds to include one or more backhaul thresholds.

* * * * *